United States Patent [19]

Fujita et al.

[11] Patent Number: 5,678,410
[45] Date of Patent: Oct. 21, 1997

US005678410A

[54] COMBINED SYSTEM OF FUEL CELL AND AIR-CONDITIONING APPARATUS

[75] Inventors: Nobuo Fujita, Toyota; Hiroyuki Mitsui; Hiroshi Aoki, both of Nagoya; Hidehito Kubo, Kariya; Keiji Toh, Kariya; Masayoshi Miura, Kariya, all of Japan

[73] Assignees: Toyota Jidosha Kabushiki Kaisha, Toyota; Kabushiki Kaisha Toyota Chuo Kenkyusho, Aichi-ken; Kabushiki Kaisha Toyoda Jidoshokki Seisakusho, Kariya, all of Japan

[21] Appl. No.: 286,191

[22] Filed: Aug. 5, 1994

[30] Foreign Application Priority Data

| | | | |
|---|---|---|---|
| Aug. 6, 1993 | [JP] | Japan | 5-196514 |
| Sep. 10, 1993 | [JP] | Japan | 5-250078 |
| Sep. 28, 1993 | [JP] | Japan | 5-265836 |
| Dec. 24, 1993 | [JP] | Japan | 5-348142 |

[51] Int. Cl.$^6$ ............................................. F25B 19/00
[52] U.S. Cl. ................... 62/7; 62/331; 62/46.2; 62/324.1; 165/104.12; 429/26
[58] Field of Search ............... 62/7, 46.1, 46.2, 62/331, 324.1; 165/104.12; 429/17, 20, 26

[56] References Cited

U.S. PATENT DOCUMENTS

| | | | |
|---|---|---|---|
| 2,565,767 | 6/1951 | Gaskell, Jr. | 62/7 |
| 5,469,913 | 11/1995 | Gamou et al. | 62/46.2 |

*Primary Examiner*—John M. Sollecito
*Attorney, Agent, or Firm*—Oblon, Spivak, McClelland, Maier & Neustadt, P.C.

[57] ABSTRACT

The present invention provides a combined system for activating a fuel cell with hydrogen absorbed and stored in a hydrogen-storage alloy to drive an electric vehicle and for conditioning the air with the hydrogen absorbed and stored in the hydrogen-storage alloy. The combined system of the invention sucks hydrogen out of the hydrogen-storage alloy by a compressor. The combined system of the invention cools the air with a cooling power generated in discharge of hydrogen from the hydrogen-storage alloy and heats the air with a heat generated in absorption of hydrogen into the hydrogen-storage alloy. The combined system preferably includes a heat storage tank disposed in a conduit of a heating medium for storing an excess of a cooling power caused by a variation in an amount of hydrogen required for the fuel cell. Alternatively, the combined system has a secondary battery which is charged with an excess power of the fuel cell and discharges to make up for a deficient power of the fuel cell.

18 Claims, 24 Drawing Sheets

COMBINED SYSTEM OF FUEL CELL AND AIR-CONDITIONING APPARATUS

BACKGROUND OF THE INVENTION

1. Field of the Invention

The present invention relates to a combined system of a fuel cell and an air-conditioning apparatus, and also to an abnormality detection unit and a control unit used in the combined system. More specifically, the invention pertains to a combined system for driving and controlling an air-conditioning apparatus and a fuel cell which is activated with hydrogen sucked out of a metal hydrides storage tank accommodating an alloy for hydrogen storage. The invention is also directed to an abnormality detection unit for detecting abnormalities of the combined system including a metal hydrides storage tank with a hydrogen-storage alloy accommodated therein, and a control unit for executing a predetermined process when the abnormality detection system detects an abnormality.

2. Description of the Related Art

In electric vehicles having a fuel cell activated with hydrogen as a fuel, hydrogen-storage alloys are typically used as a hydrogen source. Hydrogen-storage alloys absorb and discharge hydrogen according to the temperature and the pressure of the atmosphere of the hydrogen-storage alloys. Compared with other storage processes, for example, storage of liquefied hydrogen in high-pressure tanks, the hydrogen-storage alloys can store hydrogen at higher densities under lower temperatures and pressures.

In a structure that a motor of the electric vehicle is driven with outputs of the fuel cell, loading applied onto the electric vehicle significantly varies with the running conditions. It is thus required to control hydrogen discharge from the hydrogen-storage alloy to control the outputs of the fuel cell appropriately. Since the hydrogen-storage alloy discharges hydrogen through an endothermic reaction, heat corresponding to the required outputs of the fuel cell should be applied onto the hydrogen-storage alloy. One proposed structure as disclosed in JAPANESE PATENT LAYING-OPEN GAZETTE No. 51-4714 has a heater disposed in a metal hydrides storage tank with a hydrogen-storage alloy accommodated therein. A required amount of hydrogen is discharged by increasing and decreasing the electric power supplying to the heater.

Other proposed structures for supplying hydrogen to allow the fuel cell to output a required power corresponding to the loading of the electric vehicle include: that of opening an auxiliary metal hydrides storage tank according to the loading of the electric vehicle (JAPANESE PATENT LAYING-OPEN GAZETTE No. 51-4715); and that of storing hydrogen discharged from a metal hydrides storage tank into a hydrogen reservoir under conditions of the smaller loading of the electric vehicle and supplying hydrogen from the hydrogen reservoir under conditions of the greater loading of the electric vehicle (JAPANESE PATENT LAYING-OPEN GAZETTE No. 51-4716).

In the structure of heating the hydrogen-storage alloy for hydrogen discharge, however, there is a time lag between the start of heating and the actual rise in the temperature of the hydrogen-storage alloy to increase the amount of hydrogen discharge per unit time. The outputs of the fuel cell can not accordingly be increased or decreased in response to the variation in the loading of the electric vehicle. Since the variation in the loading is extremely quick, it is substantially impossible to heat or cool the hydrogen-storage alloy in response to the variation of the loading. The other proposed structures having the auxiliary metal hydrides storage tank or the hydrogen reservoir make the whole system undesirably bulky.

Another proposed structure implements air-conditioning operations by utilizing noticeable properties of the hydrogen-storage alloys, that is, hydrogen is discharged or absorbed in response to heat absorption or heat evolution. Heat exchange with the air in the room of the electric vehicle generates or absorbs heat required for discharge or absorption of hydrogen from or into the hydrogen-storage alloy. In proposed structures as disclosed in JAPANESE PATENT LAYING-OPEN GAZETTE Nos. 60-000068, 4-368228, and 4-122209, hydrogen discharge from the hydrogen-storage alloy is implemented through heat exchange with the air in the room of the electric vehicle, and the air in the room is subsequently cooled with a cooling power generated in the hydrogen discharge. These structures do not require excessive energy consumption, such as heating, for hydrogen discharge, thereby reducing the energy loss of the electric vehicle.

In the structure of obtaining heat required for hydrogen discharge from the hydrogen-storage alloy by heat exchange with the air in the room of the electric vehicle, however, an amount of hydrogen required for driving the electric vehicle is not balanced by an amount of hydrogen required for cooling the air in the room of the electric vehicle. The system giving priority to operation of the electric vehicle undesirably causes an excess or deficient cooling power. The cooling power generated in hydrogen discharge from the hydrogen-storage alloy for the generation of electricity may be significantly greater or less than the cooling power required for cooling the air in the room of the electric vehicle.

In the system of implementing hydrogen discharge and absorption from and into the metal hydrides storage tank, it is required to accurately detect the conditions of hydrogen in the tank and measure the amount of hydrogen flown into and out of the tank. Errors or malfunctions of measuring instruments used for the above detection and measurement may cause inappropriate operation control of the system. This lowers the working efficiency of the system and thereby wastes valuable energy.

SUMMARY OF THE INVENTION

One object of the invention is thus to provide a novel combined system of a fuel cell and an air-conditioning apparatus.

Another object of the invention is to enhance the responsiveness of outputs of a fuel cell against a variation in loading applied onto an electric vehicle.

Still another object of the inversion is to appropriately heat and cool air in a room of an electric vehicle with high energy efficiency.

To realize these and other objects, the invention provides a combined system of a power generator and an air-conditioning apparatus, which comprises:

a total hydrides storage tank having a hydrogen-storage alloy accommodated therein;

a power generator for generating a power with hydrogen as a fuel;

hydrogen compressor means for sucking hydrogen out of the metal hydrides storage tank in response to a load of the power generator and pressure-feeding the hydrogen into the power generator; and an air-conditioning apparatus for cooling air with a cooling power generated in desorbing the hydrogen from the metal hydrides storage tank.

In the combined system of the invention, hydrogen is not evolved by application of heat as a conventional system, but is sucked out of the hydrogen-storage alloy in the total hydrides storage tank by means of the hydrogen compressor marts and pressure-fed into the power generator requiring hydrogen as a fuel. The structure significantly improves the responsiveness of outputs of the power generator, for example, a fuel cell for generating an electric power with hydrogen as a fuel.

The above system sucks hydrogen out of the metal hydrides storage tank in response to a load of the power generator. According to another aspect of the invention, a combined system of a power generator and an air-conditioning apparatus may have a structure of sucking hydrogen out of a metal hydrides storage tank to generate a cooling power required for the air-conditioning apparatus. The latter method also improves the responsiveness of outputs of the power generator appreciably, compared with the conventional system for supplying hydrogen by thermal application.

The above combined systems suck hydrogen out of the hydrogen-storage alloy in the metal hydrides storage tank and pressure-feed hydrogen into the power generator according to the requirements of either the power generator of the air-conditioning apparatus. When the amount of requirement of the power generator is not identical with that of thin air-conditioning apparatus, the combined system preferably includes means for compensating for the a difference in the requirement amount. Typical examples of the compensating means include heat storage means for accumulating and storing an excess cooling power and supplying a deficiency of cooling power, and a secondary battery for storing an excess of electric power generated by the power generator with excess supply of hydrogen.

The invention is also directed to another combined system of a power generator and an air-conditioning apparatus, in which the problem regarding a difference between an amount of hydrogen required by the power generator and that required by the air-conditioning apparatus is solved by transferring hydrogen between a plurality of metal hydrides storage tanks.

This combined system comprises:

a plurality of metal hydrides storage tanks respectively having hydrogen-storage alloys accommodated therein;

a power generator for generating a power with hydrogen as a fuel;

hydrogen compressor means for sucking hydrogen out of at least one metal hydrides storage tank along the plurality of metal hydrides storage tanks and pressure-feeding the hydrogen into another metal hydrides storage tank different from the at least one metal hydrides storage tank;

hydrogen supply means for supplying the hydrogen pressure-fed by the hydrogen compressor mane into the power generator according to a load of the power generator;

an air-conditioning apparatus for cooling air with a cooling power generated in desorbing the hydrogen from the at least one metal hydrides storage tank and heating air with a heat generated in absorbing hydrogen into the another metal hydrides storage tank.

According to another aspect of the invention, a combined system of a power generator and an air-conditioning apparatus includes cooling power generator means using the power generator as a power source to compensate for fluctuations of the cooling power of the air-conditioning apparatus. This system implements required air-cooling with a cooling power generated in discharge of hydrogen from a hydrogen-storage alloy and a cooling power generated by the cooling power generator means. A variety of structures are applicable to such a system including difference priorities of the cooling power.

In the combined system of the power generator and the air-conditioning apparatus, precise detection of hydrogen conditions in the metal hydrides storage tank and the flow-out amount and the flow-in amount of hydrogen out of and into the metal hydrides storage tank is essential for the accurate control of the combined system. Leakage of hydrogen from a pipe or another element causes deficiency in the power or cooling power. Application of an abnormality detection unit and a control unit to the combined system is accordingly required to detect abnormality of measuring instruments or metal hydrides storage tanks or any troubles such as leakage of hydrogen without delay, thereby keeping the working efficiency of the power generator or the air-conditioning apparatus sufficiently high and realizing the high energy efficiency.

The invention accordingly provides an abnormality detection unit for detecting abnormality in a system including a total hydrides storage tank having a hydrogen-storage alloy accommodated therein, a hydrogen consumption mechanism for consuming or absorbing hydrogen, and hydrogen compressor means for supplying hydrogen from the metal hydrides storage tank to the hydrogen consumption mechanism. The abnormality detection unit in accordance with the invention includes:

mismatching detection means for detecting a mismatch of desorbing hydrogen from the metal hydrides storage tank with hydrogen consumption or absorption in the hydrogen consumption mechanism; and abnormality determination means for determining abnormal operation of the system based on a degree of the mismatch detected by the mismatching detection means.

The abnormality detection unit determines abnormal condition according to a mismatch of hydrogen aspiration with hydrogen consumption or absorption. The mismatching detection means my detect the mismatch as a difference between an amount of hydrogen discharge and an amount of hydrogen intake or as a difference between an amount of hydrogen taken out of the metal hydrides storage tank and a sum of an amount of hydrogen consumed or absorbed in the hydrogen consumption mechanism and an amount of hydrogen released from the hydrogen consumption mechanism without being consumed or absorbed.

Alternatively, the abnormality detection unit may determine abnormal condition when a relationship between a calorie generated in absorption of hydrogen into the hydrogen-storage alloy and a calorie generated in discharge of hydrogen from the hydrogen-storage alloy is deviated from a preset relationship.

Another abnormality detection unit in accordance with the invention has a simpler structure, which includes hydrogen amount detection means for detecting an amount of hydrogen received by a metal hydrides storage tank, accumulation means for accumulating amounts of hydrogen detected by the hydrogen amount detection means to determine a total amount of hydrogen, and abnormality determination means for determining abnormal operation of the metal hydrides storage tank when the total amount of hydrogen determined by the accumulation means is greater than a hydrogen absorption capacity of a hydrogen-storage alloy in the metal hydrides storage tank calculated for an amount of the hydrogen-storage alloy.

The invention is directed to still another abnormality detection unit, which stores a preset relationship between pressures and temperatures in a metal hydrides storage tank, measures an actual set of pressure and temperature in the metal hydrides storage tank, and determines abnormal operation of the metal hydrides storage tank where a relationship between the pressure and the temperature measured is deviated from the preset relationship.

A control unit in accordance with the invention includes any one of the above abnormality detection units and process means for executing a predetermined process when abnormal operation is detected. A typical example of the predetermined process stops discharge or pressure-feeding of hydrogen.

According to another feature of the invention, a combined system of a power generator and an air conditioning apparatus comprises a metal hydrides storage tank having a hydrogen-storage alloy accommodated therein, a power generator for generating power with hydrogen as a fuel, hydrogen compressor means for sucking hydrogen out of the metal hydrides storage tank and pressure feeding the hydrogen into the power generator, and an air conditioning apparatus for cooling air with a cooling power generated in desorbing hydrogen from the metal hydrides storage tank by the hydrogen compressor means.

These and other objects, features, aspects, and advantages of the present invention will become more apparent from the following detailed description of the preferred embodiment with the accompanying drawings.

DESCRIPTION OF THE PREFERRED EMBODIMENT

Figure 1:
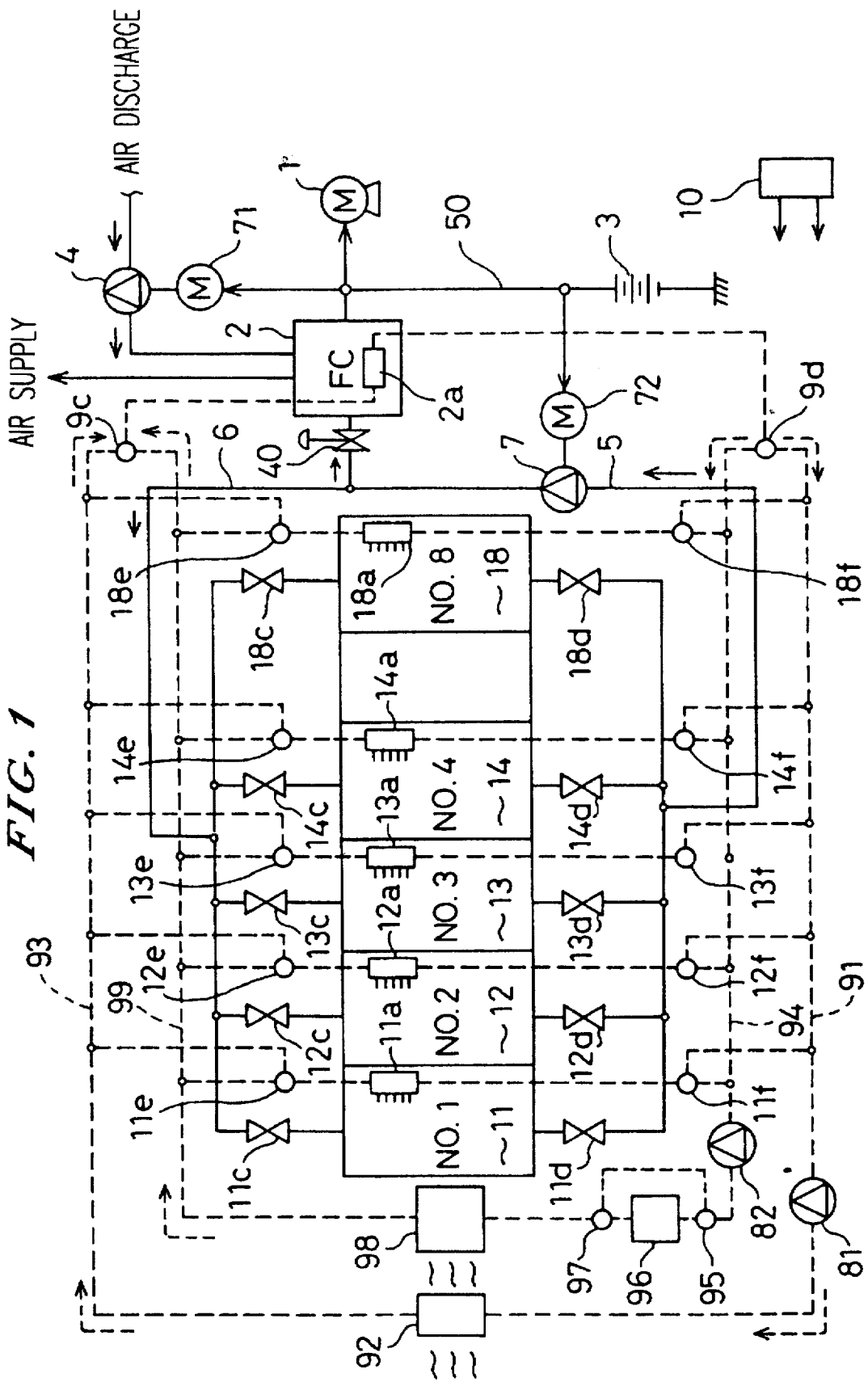
FIG. 1 is a block diagram illustrating a fundamental structure of a combined system of a fuel cell and an air-conditioning apparatus mounted on an electric vehicle, as a first embodiment in accordance with the invention.

FIG. 1 is a block diagram illustrating a fundamental structure of a combined system of a fuel cell and an air-conditioning apparatus mounted on an electric vehicle, as a first embodiment in accordance with the invention.

The combined system includes a motor 1 for activating driving wheels of the electric vehicle, a fuel cell 2 for supplying power to the motor 1 and various power-driven devices installed in or mounted on the electric vehicle, first through eighth metal hydrides storage tanks 11 through 18 for supplying hydrogen as a fuel to the fuel cell 2 as well as absorbing or producing heat required for air-conditioning of the electric vehicle, and a controller 10 for controlling activation of the fuel cell 2 and operation of various driving units.

The fuel cell 2 includes a plurality of cells which are laid one upon another in series to output a predetermined voltage generated through electrochemical conversion using hydrogen and oxygen as fuels. The fuel cell 2 used in the first embodiment is a solid polymer fuel cell having an electrolytic membrane. The fuel cell 2 includes a heat exchanger 2a for cooling the plurality of cells in the fuel cell 2. An output terminal of the fuel cell 2 is connected via a power line 50 to the motor 1, a motor 71 for driving an air compressor 4, a motor 72 for driving a hydrogen compressor 7, and an auxiliary battery 3. The air compressor 4 driven by the motor 71 compresses the open air and supplies the compressed air to an oxygen chamber (not shown) in the fuel cell 2. The hydrogen compressor 7 transfers hydrogen from one of the metal hydrides storage tanks 11 through 18 to another of the storage tanks 11 through 18 via an intake conduit 5 and a discharge conduit 6 (described later), and supplies hydrogen to the fuel cell 2. The auxiliary battery 3 supplies power at every start of operation of the fuel cell 2.

Each of the metal hydrides storage tanks 11 through 18 includes a hydrogen-storage alloy. Typical examples of the hydrogen-storage alloy include iron-titanium alloys and rare earth metal-nickel alloys, such as $LaNi_5$ and $MmNi_5$ (Mm denotes a misch metal or a mixture of rare earth metals). The hydrogen-storage alloy generally absorbs heat through hydrogen-evolving reactions and produces heat through hydrogen-absorbing reactions. The metal hydrides storage tanks 11 through 18 are provided with first solenoid valves 11c through 18c at the respective hydrogen inlets and with second solenoid valves 11d through 18d at the respective hydrogen outlets. The metal hydrides storage tanks 11 through 18 are further provided with check valves (not shown) for preventing back flow of hydrogen in series with the first solenoid valves 11c through 18c and the second solenoid valves 11d through 18d, respectively. The hydrogen outlets of the metal hydrides storage tanks 11 through 18 join together in the downstream of the second solenoid valves 11d through 18d to connect with the intake conduit 5 whereas the hydrogen inlets of the metal hydrides storage tanks 11 through 18 join together in the upstream of the first solenoid valves 11c through 18c to connect with the discharge conduit 6. The intake conduit 5 and the discharge conduit 6 are coupled with each other via the hydrogen compressor 7. When the hydrogen compressor 7 is driven under opening conditions of a second solenoid valve at the outlet of one metal hydrides storage tank and a first solenoid valve at the inlet of another metal hydrides storage tank, hydrogen transfers from one metal hydrides storage tank to another metal hydrides storage tank.

The discharge conduit 6 has a diversified passage for leading hydrogen in the discharge conduit 6 into a hydrogen chamber (not shown) of the fuel cell 2. A flow control valve 40 in the diversified passage functions to adjust the flow of hydrogen. A desired flow of hydrogen is supplied into the hydrogen chamber of the fuel cell 2 by simply adjusting the valve travel of the flow control valve 40. In another preferable structure, a pressure control valve for adjusting the hydrogen pressure supplied to the fuel cell 2 may be used instead of the flow control valve 40 for adjusting the flow of hydrogen supplied to the fuel cell 2.

The metal hydrides storage tanks 11 through 18 respectively include heat exchangers 11a through 18a, which exchange heat with the hydrogen-storage alloys in the metal hydrides storage tanks. The heat exchangers 11a through 18a are connected with first and second circulation paths through which cooling water is circulated. The first circulation path consists of a first cooling water conduit 91 and a third cooling water conduit 93, and the second circulation path consists of a second cooling water conduit 94 and a fourth cooling water conduit 99. First solenoid-operated three-way valves 11e through 18e are arranged at inlets of the heat exchangers 11a through 18a to allow the flow of cooling water into the heat exchangers 11a through 18a whereas second solenoid-operated three-way valves 11f through 18f are arranged at outlets to allow the flow of cooling water out of the heat exchangers 11a through 18a. Either the first circulation path or the second circulation path is selected to connect with each of the heat exchangers 11a through 18a by switching the corresponding first solenoid-operated three-way valves 11e through 18e and second solenoid-operated three-way valves 11f through 18f. The first and third cooling water conduits 91,93 constituting the first circulation path are provided with a pump 81 for circulation of cooling water, and a radiator 92 for cooling the cooling water with the outside air. The second and fourth cooling water conduits 94,99 constituting the second circulation path are provided with a pump 82, an air-conditioning apparatus 98 for air-conditioning the electric vehicle, a heat storage tank 96, and a bypass detouring the heat storage tank 96 with two solenoid-operated three-way valves 95 and 97. The third and the fourth cooling water conduits 93 and 99 are connected to the heat exchanger 2a in the fuel cell via a solenoid-operated three-way valve 9c, and the first and the second cooling water conduits 91 and 94 are connected to the heat exchanger 2a via a solenoid-operated three-way valve 9d. While one of the metal hydrides storage tanks 11 through 18 absorbs and accumulates hydrogen, another one of the metal hydrides storage tanks 11 through 18 forcibly discharges hydrogen. The heat exchanger corresponding to the hydrogen-absorbing metal hydrides storage tank produces heat whereas the heat exchanger corresponding to the hydrogen-evolving metal hydrides storage tank absorbs heat. Cooling water cooled by the endothermic reaction passes through one of the circulation paths, and cooling water heated by the exothermic reaction passes through the other of the circulation paths.

Figure 2:
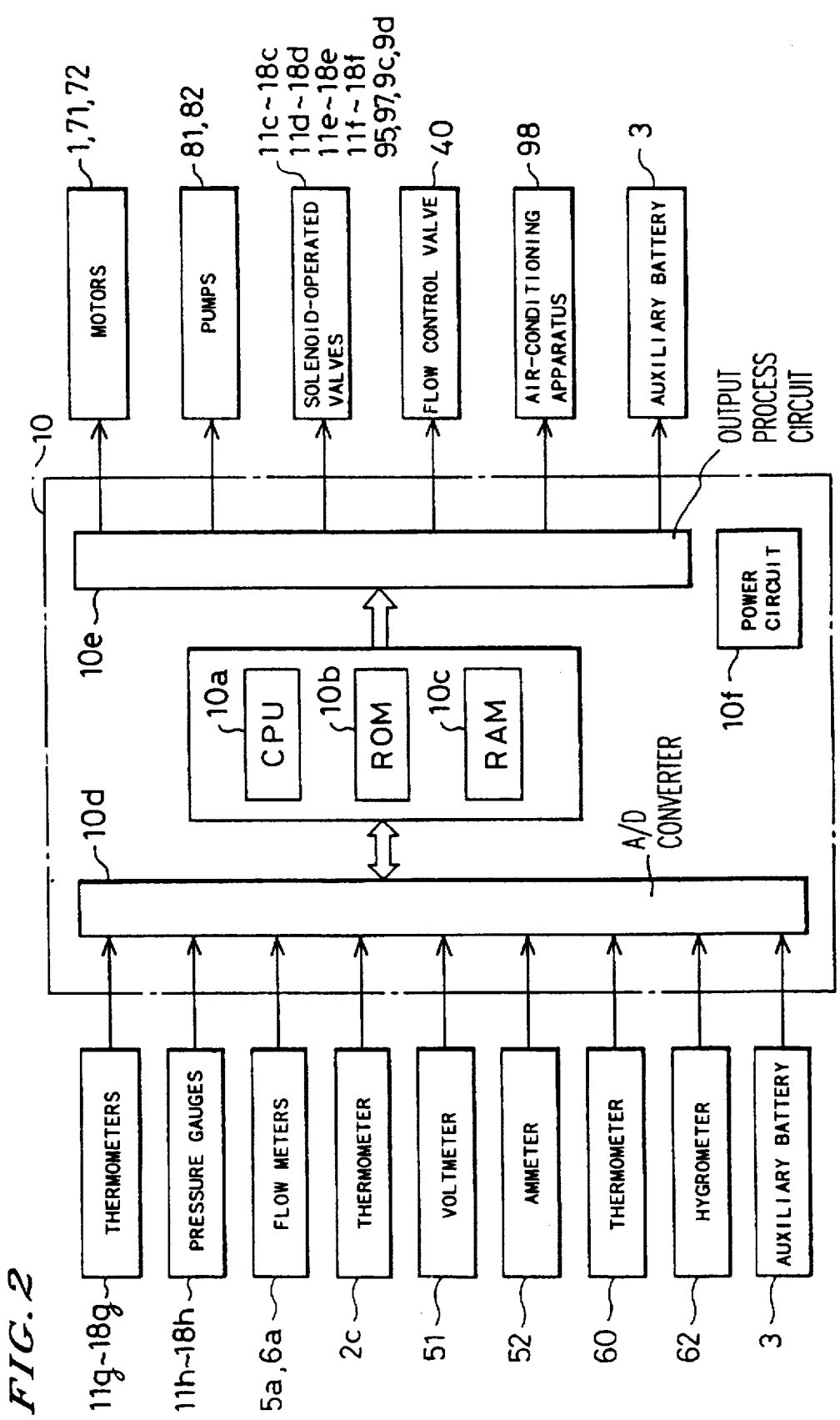
FIG. 2 is a block diagram showing an electric structure of a control system including a controller 10 in the combined system of the first embodiment.

The combined system of the embodiment further includes a variety of measuring instruments and apparatus as shown in FIG. 2, which are omitted from the drawing of FIG. 1 for clarity of illustration. The metal hydrides storage tanks 11 through 18 include thermometers 11g through 18g for measuring the in-tank temperatures and pressure gauges 11h through 18h for measuring the in-tank pressures. The intake conduit 5 and the discharge conduit 6 are respectively provided with flow meters 5a and 6a for measuring the flow of hydrogen passing through the conduit. The fuel cell 2 includes a thermometer 2c for measuring the temperature in the fuel cell 2. The power line 50 is provided with a voltmeter 51 and an ammeter 52 for measuring outputs of the fuel cell 2. A thermometer 60 for measuring the room temperature of the electric vehicle and a hygrometer 62 for measuring the interior humidity of the electric vehicle are disposed inside the electric vehicle. The auxiliary battery 3 has a hydrometer (not shown) for measuring the charge volume, and a voltmeter and an ammeter (either not shown) for measuring the power in charging or discharging. Other measuring instruments and apparatus (not shown) installed in the electric vehicle include a speedometer, an accelerator position sensor, and an accelerometer required for controlling the electric vehicle.

With further reference to FIG. 2, the controller 10 is constructed as logic circuits including a microcomputer. The controller 10 specifically includes: a CPU 10a for executing a variety of operations according to preset control programs so as to control the combined system of the embodiment; a ROM 10b in which control programs and control data are previously stored to allow the CPU 10a to execute the variety of operations; a RAM 10c which various data required for the operations of the CPU 10a are temporarily written in and read out; an A/D converter 10d for receiving detection signals from the various measuring instruments and apparatus mentioned above; and an output process circuit 10e for generating driving signals based on the results of operations by the CPU 10a. The output process circuit 10e outputs the driving signals to the corresponding element or elements, such as the motors 1,72,73, the pumps 81,82, the solenoid-operated valves 11c through 18c, 11d through 18d, 11e through 18e, 11f through 18f, 95, 97, 9c, 9d, the flow control valve 40, the air-conditioning apparatus 98, and the auxiliary battery 3. The controller 10 further includes a power circuit 10f, which supplies a required voltage to each of the various elements described above. The controller 10 thus constructed regulates operations of the combined system of the first embodiment.

The combined system of the embodiment works in the following manner. For the clarity of explanation, it is supposed that the controller 10 opens and closes the solenoid-operated valves 11c through 18c, 11d through 18d, 11e through 18e, 11f through 18f, 9c, 9d, 95, and 97 at regular intervals and that the air compressor 4, the hydrogen compressor 7, and the pumps 81 and 82 are respectively driven at a desired rotating speed.

Operation for cooling the air is described first. The metal hydrides storage tanks 11 through 18 having the hydrogen-storage alloys accommodated therein function as fuel reservoirs for the fuel cell 2. One of the metal hydrides storage tanks is not completely charged with hydrogen whereas the other metal hydrides storage tanks are fully charged with hydrogen. In the embodiment, the hydrogen storage alloy in the first metal hydrides storage tank 11 does not contain a full capacity of hydrogen. Hydrogen absorbed and stored in the metal hydrides storage tanks 11 through 18 is gradually consumed and decreases as the hydrogen is supplied into the fuel cell 2. In the following description, it is supposed that hydrogen is not completely discharged from at least the hydrogen-storage alloy accommodated in the second metal hydrides storage tank 12. Under such assumption, the first solenoid valve 11c mounted on the inlet of the first metal hydrides storage tank 11 and the second solenoid valve 12d mounted on the outlet of the second metal hydrides storage tank 12 are opened whereas all the other solenoid-operated valves are closed. The first heat exchanger 12a is connected to the second and the fourth cooling water conduits 94 and 99 by regulating the solenoid-operated three-way valves 12e and 12f while the other heat exchangers 11a, 13a through 18a are connected to the first and the third cooling water conduits 91 and 93 by regulating the solenoid-operated three-way valves 11e, 13e through 18e, 11f, and 13f through 18f, respectively.

Activation of the hydrogen compressor 7 after opening and closing operations of the valves makes hydrogen forcibly discharged from the hydrogen-storage alloy of the second metal hydrides storage tank 12. The forcibly-discharged hydrogen flows through the intake conduit 5, is pressurized by the hydrogen compressor 7, flows into the first metal hydrides storage tank 11 via the discharge conduit 6, and is absorbed into the hydrogen-storage alloy in the first metal hydrides storage tank 11. The first metal hydrides storage tank 11 functions as a hydrogen-absorbing tank to evolve heat whereas the second metal hydrides storage tank 12 functions as a hydrogen-evolving tank to absorb heat or generate a cooling power. The cooling power generated by the second metal hydrides storage tank 12 lowers the temperature of cooling water circulated in the second and the fourth cooling water conduits 94 and 99 and is transmitted to the air-conditioning apparatus 98 via the heat storage tank 96. The air-conditioning apparatus 98 exchanges the lowered temperature of cooling water with the air fed into the air-conditioning apparatus 98 and cools the air with the cooling water having the lowered temperature. Heat produced in the first metal hydrides storage tank 11 is, on the other hand, transmitted to the radiator 92 with the cooling water circulating through the first and the third cooling water conduits 91 and 93, and evolved outside.

The fuel cell 2 is activated in the following manner. The flow control valve 40 takes a high pressure (approximately 10 atmospheres) of hydrogen out of the discharge conduit 6, decompresses the high-pressure hydrogen to a desired pressure, and supplies the decompressed hydrogen to the hydrogen chamber in the fuel cell 2. The fuel cell 2 supplies a required power generated by electrochemical conversion of oxygen and the hydrogen to the motor 1 and a residual power to the auxiliary battery 3 and various elements of the vehicle as electric loads. The amount of hydrogen supplied into the fuel cell 2 is regulated by changing the valve travel of the flow control valve 40, so as to control the output of the fuel cell 2 varied with a variation in the load. The power-driven flow control valve 40 regulates the amount of hydrogen supplied into the fuel cell 2 with a favorably high responsiveness. The heat exchanger 2a in the fuel cell 2 is connected to the first and the third cooling water conduits 91 and 93 via the solenoid-operated three-way valves 9c and 9d. Calories generated in the fuel cell 2 are transmitted to the radiator 92 with the cooling water running through the first and the third cooling water conduits 91 and 93 and emitted outside.

After completion of forcible hydrogen discharge from the hydrogen-storage alloy in the second metal hydrides storage tank 12, the second solenoid valve 12d disposed at the outlet of the second metal hydrides storage tank 12 is closed whereas the second solenoid valve 13d disposed at the outlet of the third metal hydrides storage tank 13 is opened. The heat exchanger 13a of the third metal hydrides storage tank 13 is then connected to the second and the fourth cooling water conduits 94 and 99 via the solenoid-operated three-way valves 13e and 13f. The other heat exchangers 11a, 12a, and 14a through 18a are, on the other hand, connected to the first and the third cooling water conduits 91 and 93 via the solenoid-operated three-way valves 11e, 12e, 14e through 18e, 11f, 12f, and 14f through 18f, respectively. Such valve operations make the third metal hydrides storage tank 13 start working as a hydrogen-evolving tank in place of the second metal hydrides storage tank 12. Completion of forcible hydrogen discharge from the hydrogen-storage alloy in the second metal hydrides storage tank 12 is determined according to the temperature and the pressure in the metal hydrides storage tank 12 in the embodiment. Determination of the completed hydrogen discharge may, however, be based on detections of the in-conduit temperature, the in-conduit pressure, and the flow of hydrogen. One modified structure, for example, sums up amounts of hydrogen corresponding to the hydrogen flows detected at predetermined time intervals from a start of forcible hydrogen discharge from the metal hydrides storage tank 12, and determines completion of forcible hydrogen discharge when a total amount of hydrogen reaches a hydrogen storage capacity of the hydrogen-storage alloy in the metal hydrides storage tank 12. Another possible structure determines completion of forcible hydrogen discharge when the pressure in the metal hydrides storage tank 12 becomes equal to or less than a predetermined value.

When hydrogen absorption into the hydrogen-storage alloy in the first metal hydrides storage tank 11 is completed, the first solenoid valve 11c disposed on the first metal hydrides storage tank 11 is closed. The first solenoid valve 12c disposed on the second metal hydrides storage tank 12 is subsequently opened, where forcible hydrogen discharge from the hydrogen-storage alloy in the second metal hydrides storage tank 12 is completed previously. Such valve operations allow the second metal hydrides storage tank 12 to function as a hydrogen-absorbing tank instead of the first metal hydrides storage tank 11. In the embodiment, completion of hydrogen absorption into the hydrogen-storage alloy in the first metal hydrides storage tank 11 is determined according to the temperature and the pressure in the metal hydrides storage tank 11 in the same manner as completion of forcible hydrogen discharge. Determination of the completed hydrogen absorption may, however, be based on detections of the in-conduit temperature, the in-conduit pressure, and the flow of hydrogen.

When hydrogen absorption into the hydrogen-storage alloy in the second metal hydrides storage tank 12 or forcible hydrogen discharge from the hydrogen-storage alloy in the third metal hydrides storage tank 13 is completed, the hydrogen-absorbing tank and the hydrogen-evolving tank are shifted in the manner described above. Operations of the solenoid-operated valves 11c through 18c, 11d through 18d, 11e through 18e, and 11f through 18f disposed on the respective metal hydrides storage tanks 11 through 18 successively shift the hydrogen-absorbing tank and the hydrogen-evolving tank, thereby allowing the cooling power to be generated continuously.

Such valve operation processes are executed by the controller 10 according to an interruption routine activated at intervals of several tens milliseconds. The controller 10 determines whether hydrogen absorption or hydrogen discharge has been completed in any metal hydrides storage tank. Determining that hydrogen absorption has been completed in a certain metal hydrides storage tank, the controller 10 closes a solenoid valve at an inlet of the certain metal hydrides storage tank. Determining that hydrogen discharge has been completed from a certain metal hydrides storage tank, on the other hand, the controller 10 closes a solenoid valve at an outlet of the certain metal hydrides storage tank. The controller 10 then specifies another metal hydrides storage tank where hydrogen absorption or hydrogen discharge has not been completed, and opens a solenoid valve at an inlet of or an outlet of the another metal hydrides storage tank. The controller 10 also opens the solenoid-operated three-way valves 11e through 18e and 11f through 18f of the cooling water conduits. When hydrogen discharge has been completed from all the metal hydrides storage tanks, the controller 10 determines exhaustion of all the fuel, stops operation of the system, and informs the user of the exhaustion of the fuel.

In the embodiment, the heat storage tank 96 is disposed to compensate for a temporary imbalance between the amount of cooling power generated by the metal hydrides storage tanks 11 through 18 and the amount of cooling power required for the air-conditioning apparatus 98. The combined system may, however, not include the heat storage tank 96 according to the requirements. In the structure having the heat storage tank 96, cooling water may run through the bypass in response to the switching of the solenoid-operated three-way valves 95 and 97 when storage of an excess cooling power or supply of a deficient cooling power is not required.

When the air-conditioning is required while no power generation is demanded, that is, while the motor 1 is stopped or the fuel cell 2 is inactivated, the flow control valve 40 is closed to stop the air compressor 4. In such a case, power required for the motor 72 which drives the hydrogen compressor 7, the pumps 81 and 82, and the solenoid valves is supplied from the auxiliary battery 3.

When power generation is required while the air-conditioning is not demanded, on the other hand, power generation implements through the following valve operations. Only a second solenoid valve (for example, 14d) disposed at an outlet of a certain metal hydrides storage tank (for example, 14) is opened, where hydrogen discharge has not been completed from the hydrogen-storage alloy accommodated therein. Hydrogen discharged from the certain metal hydrides storage tank (14) is supplied by the hydrogen compressor 7 to the fuel cell 2 via the discharge conduit 6 and the flow control valve 40. Since the pumps 81 and 82 are not activated, all the hydrogen discharged is supplied to the fuel cell 2 and is not absorbed in other metal hydrides storage tanks.

Although the hydrogen compressor 7 is driven in this embodiment, power generation may be implemented through the following valve operations under non-service conditions of the hydrogen compressor 7. A first solenoid valve (for example, 15c) disposed at an inlet of a certain metal hydrides storage tank (for example, 15) is opened, where hydrogen discharge has not been completed from the hydrogen-storage alloy accommodated therein. The pump 81 is then driven while neither the pump 82 nor the hydrogen compressor 7 is activated. Since the hydrogen compressor 7 is stopped, hydrogen is reversely flown out through the open inlet of the metal hydrides storage tank (15) and supplied to the fuel cell 2 via the discharge conduit 6 and the flow control valve 40. The fuel cell 2 generates power using the hydrogen supplied as a fuel. Heat evolved from the fuel cell 2 accompanied by power generation is transmitted through the first and the third cooling water conduits 91 and 93 connected to the heat exchanger 2a of the fuel cell 2 and discharged outside from the radiator 92. The heat exchanger (15a) incorporated in the hydrogen-evolving metal hydrides storage tank (15) is subsequently connected to the first and the third cooling water conduits 91 and 93 with the solenoid-operated three-way valves (15e, 15f). Part of the heat evolved from the fuel cell 2 is supplied into the hydrogen-evolving metal hydrides storage tank (15) to accelerate hydrogen discharge from the hydrogen-storage alloy accommodated in the metal hydrides storage tank (15). The structure may include a bypass (not shown) detouring the radiator 92, which prevents calories received by the heat exchanger 2a from being emitted through the radiator 92 and supplies the calories to the metal hydrides storage tank (15).

Heating simultaneous with power generation is implemented through the following valve operations. A first solenoid valve (for example, 16c) disposed at an inlet of a certain metal hydrides storage tank (for example, 16) is opened, where hydrogen discharge has not been completed from the hydrogen-storage alloy accommodated therein. The heat exchanger 2a incorporated in the fuel cell 2 is then connected to the second and the fourth cooling water conduits 94 and 99 by opening the solenoid-operated three-way valves 9c and 9d. The pump 82 is driven while the hydrogen compressor 7 and the pump 81 are stopped. Under such conditions, hydrogen discharged from the hydrogen-storage alloy in the metal hydrides storage tank (16) is reversely flown out through the open inlet of the metal hydrides storage tank (16) and supplied to the fuel cell 2 via the discharge conduit 6 and the flow control valve 40. Heat evolved from the fuel cell 2 accompanied by power generation is transmitted from the heat exchanger 2a of the fuel cell 2 through the second cooling water conduit 94 to the air-conditioning apparatus 98, which heats the air in the room of the electric vehicle with the transmitted heat. The cooling water passing through the air-conditioning apparatus 98 is circulated via the fourth cooling water conduit 99. Part of the cooling water heated by the heat exchanger 2a is supplied to the metal hydrides storage tank (16) to accelerate hydrogen discharge from the hydrogen-storage alloy accommodated therein.

The heating structure may be modified in various ways. One example of such modification includes a structure for allowing continuous operation of the hydrogen compressor 7. In this case, the first solenoid valve 11c disposed at the inlet of the hydrogen-absorbable metal hydrides storage tank 11 and the second solenoid valve 12d disposed at the outlet of the hydrogen-dischargeable metal hydrides storage tank 12 are successively opened. The heat exchanger 11a is then connected to the second and the fourth cooling water conduits 94 and 99 through operation of the solenoid-operated three-way valves 11e and 11f. The heat exchanger 2a included in the fuel cell 2 is also connected to the second and the fourth cooling water conduits 94 and 99 by switching the solenoid-operated three-way valves 9c and 9d. Operation of the hydrogen compressor 7 under such valve conditions allows the metal hydrides storage tank 11 to absorb hydrogen into the hydrogen-storage alloy accommodated therein and generate heat. The heat generated in the metal hydrides storage tank 11 is transmitted through the heat exchanger 11a and the second cooling water conduit 94 to the air-conditioning apparatus 98, which heats the air in the room of the electric vehicle with the transmitted heat. Heat generated by the fuel cell 2 is also transmitted via the heat exchanger 2a and the second cooling water conduit 94 to the air-conditioning apparatus 98 for the air-heating operation. A cooling power generated in discharge of hydrogen from the metal hydrides storage tank 12 is transmitted to the radiator 92 via the heat exchanger 12a and the first cooling water conduit 91 and emitted outside. An excess heat of the fuel cell 2 and the metal hydrides storage tank 11 may be used for heat absorption in the metal hydrides storage tank 12. After hydrogen discharge from the hydrogen-storage alloy in the metal hydrides storage tank 12 or hydrogen absorption into the hydrogen-storage alloy in the metal hydrides storage tank 11 is completed, the hydrogen-absorbing tank and the hydrogen-evolving tank are successively shifted through operations of the solenoid-operated valves 11c through 18c, 11d through 18d, 11e through 18e, and 11f through 18f. The flow control valve 40 is closed when operation of the fuel cell 2 is not required.

The combined system of the fuel cell and the air-conditioning apparatus of the first embodiment implements the air-conditioning with the cooling power or the heat generated in forcible discharge and absorption of hydrogen from and into the hydrogen-storage alloy, which stores hydrogen supplied to the fuel cell 2 as a fuel. Compared with the conventional air-conditioning apparatus based on a refrigerating cycle, the combined system of the embodiment has a simpler structure. The system of the invention does not require any refrigerants such as chlorofluorocarbons, which are essential for the conventional refrigerating cycle-based air-conditioning apparatus. Evolution and absorption of hydrogen from and into the hydrogen-storage alloy is forcibly conducted with the hydrogen compressor 7. This allows the air-conditioning apparatus to be operated irrespective of charging or discharging of the fuel cell 2. The system includes the first through the eighth metal hydrides storage tanks 11 through 18, and only one of the eight metal hydrides storage tanks is initially empty. Only two metal hydrides storage tanks including hydrogen-storage alloys are sufficient for the above operation. The greater number of metal hydrides storage tanks is, however, preferable since the rate of vacant hydrogen-storage alloys can be reduced; that is, the rate of hydrogen absorption to the whole weight of the hydrogen-storage alloys is heightened.

Figure 3:
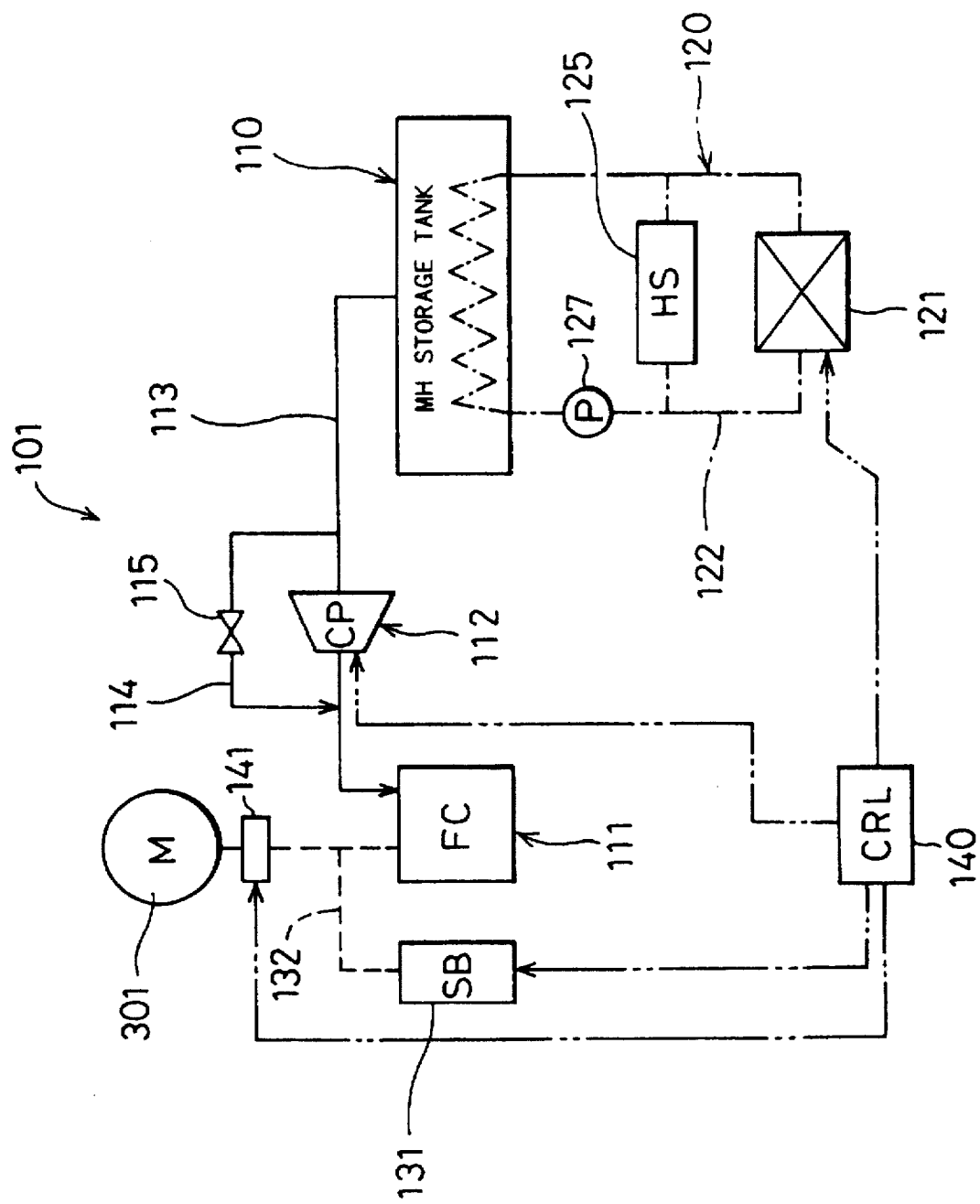
FIG. 3 is a block diagram showing a fundamental structure of a combined system 101 of a fuel cell and an air-conditioning apparatus mounted on an electric vehicle, as a second embodiment in accordance with the invention.

Another combined system of a fuel cell and an air-conditioning apparatus is described as a second embodiment in accordance with the invention. FIG. 3 is a block diagram illustrating a fundamental structure of a combined system 101 of a fuel cell and an air-conditioning apparatus mounted on an electric vehicle.

The combined system 101 of the second embodiment includes a motor 301 for driving the electric vehicle, a fuel cell 111 for generating power with hydrogen and oxygen used as fuels and supplying a required power to the motor 301 and other electric devices mounted on the electric vehicle, an air-conditioning apparatus 120 for cooling the air in the electric vehicle, a metal hydrides storage tank 110 (hereinafter referred to as MH storage tank) for supplying hydrogen to the fuel cell 111 and absorbing heat for air-cooling operation of the air-conditioning apparatus 120, and a controller 140 for regulating the power supply to the motor 301 and controlling operations of the fuel cell 111 and the air-conditioning apparatus 120.

The MH storage tank 110 includes a hydrogen-storage alloy identical with those contained in the first through the eighth metal hydrides storage tanks 11 through 18 in the first embodiment. The MH storage tank 110 is not required to have plural sections as in the first embodiment but has a single-chamber structure. The MH storage tank 110 connects with the fuel cell 111 via a hydrogen supply conduit 113, which is provided with a hydrogen compressor 112 or another pressure-type hydrogen feeder. The hydrogen compressor 112 is connected to the controller 140 to be driven in response to control signals output from the controller 140, and supplies hydrogen sucked out of the hydrogen-storage alloy in the MH storage tank 110 into the fuel cell 111. The hydrogen supply conduit 113 has a bypass 114 detouring the hydrogen compressor 112. A control valve 115 is disposed in the bypass 114 for opening and closing the bypass 114. Hydrogen stored in the MH storage tank 110 can be supplied into the fuel cell 111 not via the hydrogen compressor 112 but directly through the bypass 114 by opening the control valve 115.

The MH storage tank 110 connects with the air-conditioning apparatus 120 via a heating medium conduit 122 constituting a circulation path. A heating medium, such as water or brine, is circulated through the heating medium conduit 122. The MH storage tank 120 exchanges heat with the air-conditioning apparatus 120 via the heating medium circulated in the heating medium conduit 122, so that the MH storage tank 120 receives heat required for forcible discharge of hydrogen from the hydrogen-storage alloy and the air-conditioning apparatus 120 receives the cooling power required for lowering the room temperature in the electric vehicle.

The air-conditioning apparatus 120 includes a heat exchanger 121 for receiving the cooling power obtained from the MH storage tank 110 via the heating medium conduit 122 to cool the air in the electric vehicle, a heat storage tank 125 disposed in parallel with the heat exchanger 121 for accumulating and storing an excess of the cooling power output from the MH storage tank 110, a pump 127 for circulating the heating medium through the heating medium conduit 122, and a fan (not shown) for producing a current of the cooled air inside the electric vehicle. The heat exchanger 121 is connected to the controller 140 and has a valve for regulating the flow of the heating medium for heat exchange based on control signals output from the controller 140. The heat storage tank 125 stores an excess of the cooling power when the MH storage tank 110 generates the cooling power greater than a required amount for the heat exchanger 121. When the cooling power generated by the MH storage tank 110 does not fulfill a required amount for the heat exchanger 121, the heat storage tank 125 starts supplying the cooling power once stored therein into the heat exchanger 121 to meet the deficiency.

An output terminal of the fuel cell 111 is coupled with the motor 301 via a conductive line 132 with a DC-DC converter 141, which is connected to the controller 140. The controller 140 outputs control signals to regulate the power supplied from the fuel cell 111 to the motor 301. The fuel cell 111 is further connected to a secondary battery 131 via the conductive line 132. The secondary battery 131 is also connected to the controller 140 to implement charging and discharging based on control signals output from the controller 140. The secondary battery 131 is charged with an excess power of the fuel cell 111 and discharges to make up for a deficiency of power of the fuel cell 111.

Figure 4:
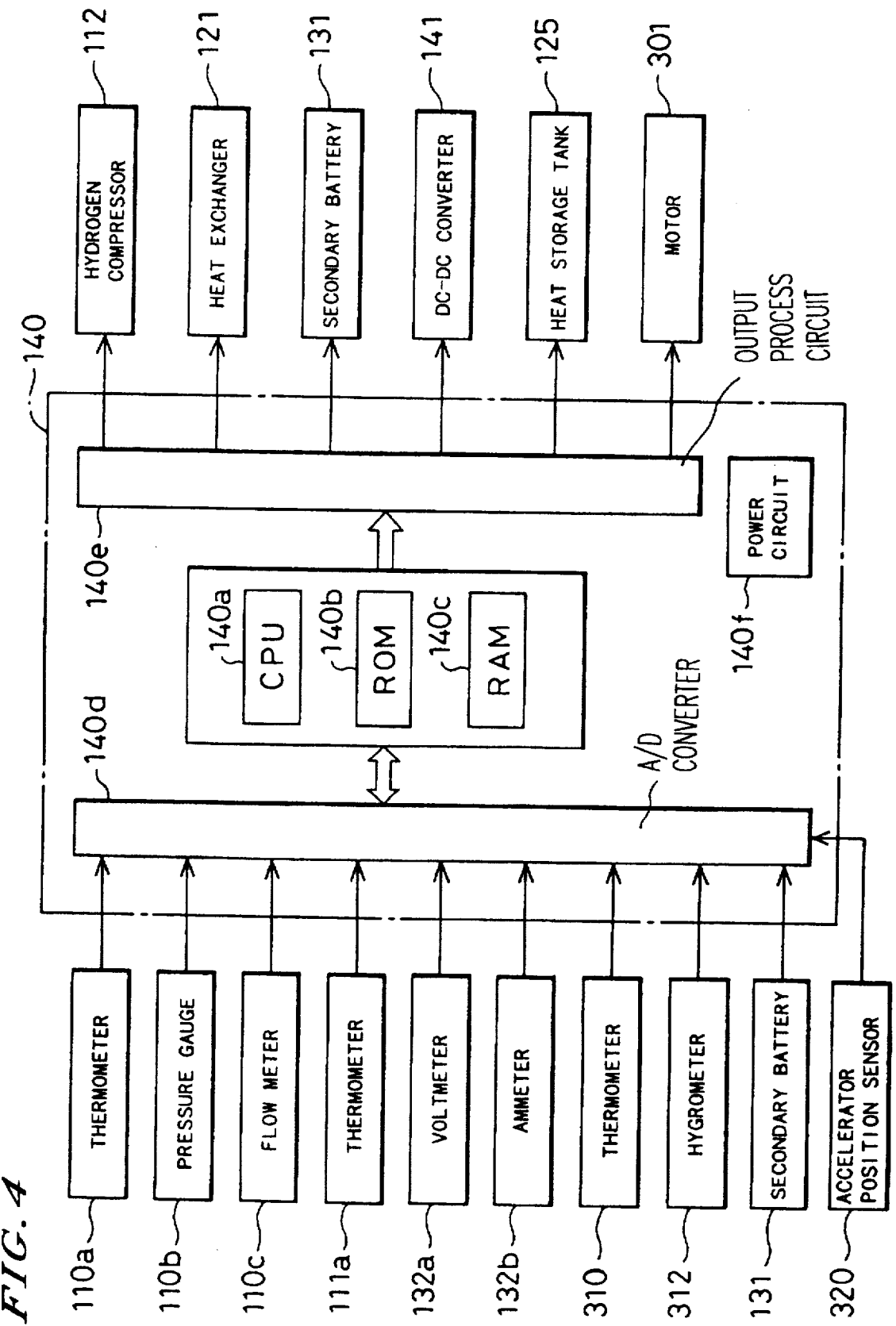
FIG. 4 is a block diagram showing an electric structure of a control system including a controller 140 in the combined system of the second embodiment.

As illustrated in FIG. 4, the combined system 101 of the second embodiment includes a variety of measuring instruments and apparatus. The MH storage tank 110 is provided with a thermometer 110a for measuring the temperature in the MH storage tank 110, a pressure gauge 110b for measuring the in-tank pressure, and a flow meter 110c for measuring the flow of hydrogen sucked out of the MH storage tank 110. The fuel cell 111 includes a thermometer 111a for measuring the temperature in the fuel cell 111. A voltmeter 132a and an ammeter 132b for measuring outputs of the fuel cell 111 are arranged on the conductive line 132. A thermometer 310 for measuring the room temperature of the electric vehicle and a hygrometer 312 for measuring the interior humidity of the electric vehicle are installed in the electric vehicle. The secondary battery 131 has a hydrometer (not shown) for measuring the charge volume, and a voltmeter and an ammeter (either not shown) for measuriuring the power in charging or discharging. Other measuring instruments and apparatus installed in the electric vehicle include a speedometer (not shown), an accelerator position sensor 320, and an accelerometer (not shown) required for controlling the electric vehicle.

With further reference to FIG. 4, the controller 140 has a structure similar to that of the controller 10 of the first embodiment, and includes a CPU 140a for executing a variety of operations, a ROM 140b, a RAM 140c, an A/D converter 140d for receiving detection signals from the measuring instruments and apparatus described above, and an output process circuit 140e for receiving the results of operations executed by the CPU 140a and outputting driving signals to the hydrogen compressor 112, the heat exchanger 121, the secondary battery 131, the DC-DC converter 141, the heat storage tank 125, and the motor 301. The controller 140 further includes a power circuit 140f, which supplies a required voltage to each of the various elements described above. The controller 140 thus constructed regulates operations of the combined system 101 of the second embodiment.

The combined system 101 of the second embodiment works in the following manner. Running control of the electric vehicle is described first based on an operation control routine of the hydrogen compressor and the secondary battery shown in the flowchart of FIG. 5. The operation control routine of the hydrogen compressor and the secondary battery is executed by the CPU 140a at predetermined time intervals, for example, at every 10 milliseconds. When the program enters the routine, the CPU 140a receives detection signals output from the various measuring instruments and apparatus via the A/D converter 140d at step S200. The detection signals read by the CPU 140a include those output from the accelerator position sensor 320 and the speedometer (not shown) for detecting the vehicle driving conditions; those from the thermometer 111a, the voltmeter 132a, and the ammeter 132b for detecting outputs of the fuel cell 111; and those from the hydrometer, the voltmeter, and the ammeter (not shown) for detecting charging conditions of the secondary battery 131. At step S210, the CPU 140a determines a total power required for running the vehicle and driving all the power-driven instruments and apparatus, based on the detection signals read at step S200. In the description below, the power required for driving power-driven instruments and apparatus is referred to as the auxiliary power.

The required power determined at step S210 is then compared with the output of the fuel cell 111 at step S220. When the output of the fuel cell 111 is less than the required power, the program goes to step S230 at which the spouting pressure or the spouting amount of the hydrogen compressor 112 is increased. The program then proceeds to step S240 at which the required power is compared with the maximum output of the fuel cell 111. When the required power is equal to or greater than the maximum output of the fuel cell 111 at step S240, the program goes to step S250 at which a discharge from the secondary battery 131 is used to make up for the deficient power. The program then exits from the routine.

When the output of the fuel cell 111 is greater than the required power at step S220, the program proceeds to step S260 at which the charge volume of the secondary battery 131 is compared with a preset value S. When the charge volume is smaller than the preset value S, the program goes to step S270 at which the secondary battery 131 is charged with an excess power output from the fuel cell 111. The program then exits from the routine. When the charge volume is equal to or greater than the preset value S, on the contrary, the program goes to step S280 at which the spouting pressure of the hydrogen compressor 112 is decreased, and then exits from the routine. The excess power output from the fuel cell 111 and used for charging the secondary battery 131 is adjusted to be equal to a predetermined value M. While the electric vehicle is under non-driving conditions, it is determined whether power generation of the fuel cell 111 is to be continued or stopped according to the decrease in the charge volume of the secondary battery 131.

Figure 6:
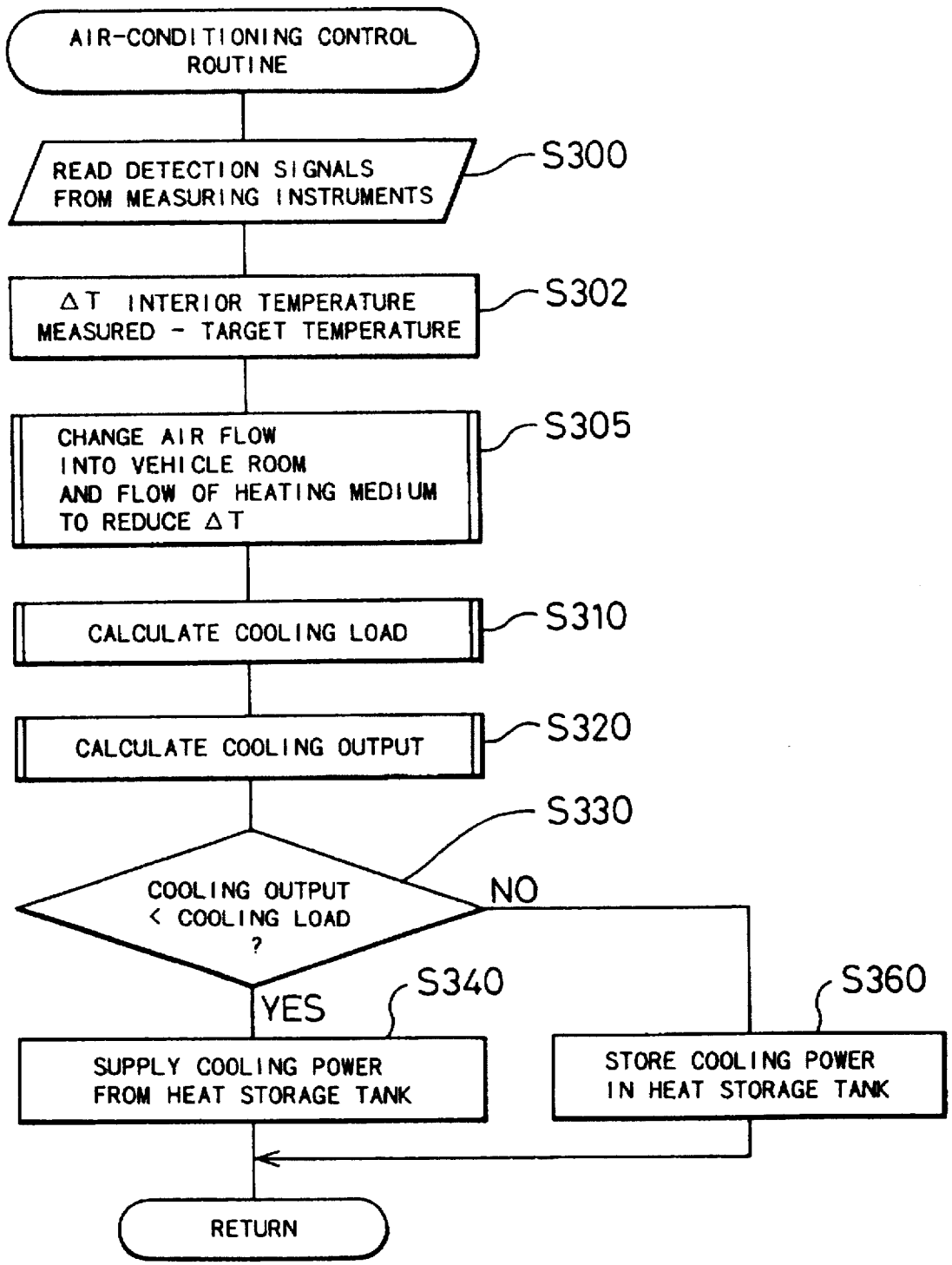
FIG. 6 is a flowchart illustrating an air-conditioning control routine executed by the controller 140.

Air conditioning in the room of the electric vehicle is described according to an air-conditioning control routine shown in the flowchart of FIG. 6. The air-conditioning control routine is executed by the CPU 140a at predetermined time intervals, for example, at every 10 milliseconds. When the program enters the routine, the CPU 140a receives detection signals output from the various measuring instruments and apparatus via the A/D converter 140d at step S300. The detection signals read by the CPU 140a include: those output from the thermometer 310 for measuring the room temperature of the electric vehicle; those from the hygrometer 312 for measuring the interior humidity; those from the thermometer 111a, the voltmeter 132a, and the ammeter 132b for detecting outputs of the fuel cell 111; and those from the hydrometer, the voltmeter, and the ammeter (not shown) for detecting charging conditions of the secondary battery 131. At step S302, the CPU 140a determines a deviation ΔT of the room temperature read at step S300 from a target temperature. The CPU 140a then varies the air flow fed into the room of the electric vehicle as well as the flow of the heating medium passing through the heat exchanger 121 for cooling the interior air so as to compensate for the deviation ΔT at step S305.

The program proceeds to step S310 at which the CPU 140a determines a cooling power required for making the room temperature read at step S300 equal to the target temperature (hereinafter referred to as the cooling load). At subsequent step S320, the CPU 140a determines an amount of hydrogen sucked out of the hydrogen-storage alloy based on the outputs of the fuel cell 111, calculates a cooling power generated in the MH storage tank 110 for the discharge amount of hydrogen, and determines a calorie used for cooling the air (hereinafter referred to as the cooling output) according to the cooling power. Since the amount of hydrogen sucked out of the hydrogen-storage alloy depends upon the outputs of the fuel cell 111, the cooling output is not identical with the cooling load in many cases.

The cooling output is compared with the cooling load at step S330. When the cooling output is smaller than the cooling load, the program goes to step S340 at which a cooling power is supplied from the heat storage tank 125 into the heat exchanger 121 via the heating medium. When the cooling output is equal to or greater than the cooling load, on the other hand, the program goes to step S360 at which a cooling power is accumulated and stored in the heat storage tank 125, and then exits from the routine. When the supplied cooling power from the heat storage tank 125 does not fulfill the cooling load or exceeds the cooling load, the spouting pressure of the hydrogen compressor 112 may be increased or decreased to adjust the amount of hydrogen supply. Such adjustment causes difference between the outputs of the fuel cell 111 and the required power. Charging and discharging of the secondary battery 131 compensate for an excess or a deficiency of the outputs of the fuel cell 111 with respect to the required power.

Figure 7:
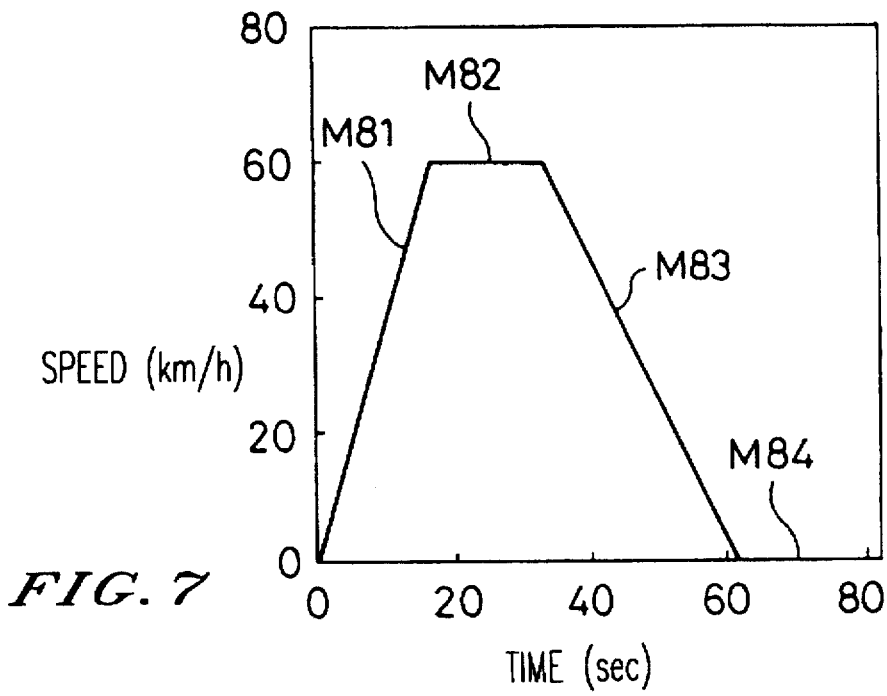
FIG. 7 is a graph showing a running pattern in a test run of an electric vehicle.

Actual driving of the electric vehicle with the combined system 101 of the second embodiment is described according to the graph of FIG. 7 illustrating a running pattern in a test run of the electric vehicle. As shown in FIG. 7, the running pattern includes four different modes: an acceleration mode M81 (17 seconds) in which the vehicle under non-driving conditions is accelerated to the speed of 60 km/h; a cruising mode M82 (17 seconds) in which the vehicle is driven at the cruising speed of 60 km/h; a deceleration mode M83 (28.5 seconds) in which the vehicle speed is reduced from the cruising speed to zero; and the stop mode M84 (18.5 seconds) in which the vehicle is at a stop or under non-driving conditions.

The combined system 101 used in the experiment had the following settings. The MH storage tank 110 mounted on the electric vehicle was filled with 100 kilograms of an MmNi hydrogen-storage alloy, and the fuel cell 111 had a maximum output of 40 kilowatts. A lead-acid battery having a charging capacity of 8 kwh was used for the secondary battery 131 to compensate for an excess or a deficiency of the outputs of the fuel cell 111 with respect to the required power. The total weight of the electric vehicle including a driver was 2.2 tons.

Figure 8:
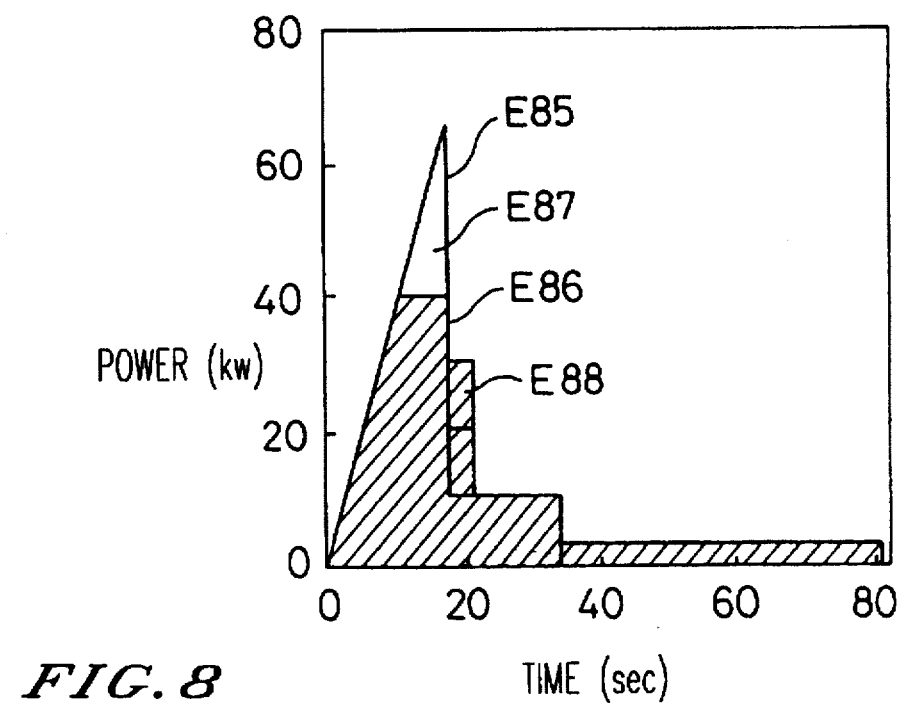
FIG. 8 is a graph showing variations in the required power and in the actual output of a fuel cell 111 in the test run of FIG. 7.

FIG. 8 is a graph showing variations in the required power and the outputs of the fuel cell 111 in the test run of FIG. 7. A first curve E85 represents a variation in the total power (driving force+auxiliary power) required for the vehicle in the test run of FIG. 7. A second curve E86 represents a variation in the outputs of the fuel cell 111 in the test run of FIG. 7. In the graph of FIG. 8, the second curve E86 defines the outline of an area filled with slant lines.

In the acceleration mode M81, the spouting pressure of the hydrogen compressor 112 is continuously heightened to enhance the amount of hydrogen supply and thereby increase the outputs of the fuel cell 111 until the required power reaches the maximum output of the fuel cell 111. When the required power exceeds the maximum output of the fuel cell 111, a discharge from the secondary battery 131 is used to make up for a deficiency of the power. The amount of power supplemented by discharging from the secondary battery is shown as a vacant area E87 in the drawing of FIG. 8. In the test run, discharging from the secondary battery 131 was required when approximately 11 seconds had elapsed since the start of acceleration. The discharge from the secondary battery continued for six seconds until the vehicle speed reached 60 km/h. A decrease in the charge volume of the secondary battery 131 due to the discharge was approximately 20 wh.

In the test run, the required power was 10.3 kw in the cruising mode M82. For charging the secondary battery 131 discharged in the acceleration mode M81, however, the fuel cell 111 was operated for a certain time period (approximately 4 seconds) at an output of a preset value M, which is greater than the required power. The power used for charging the secondary battery 131 is shown by a rectangular area E88 filled with slant lines in the drawing of FIG. 8.

In the deceleration mode M83 and the stop mode M84, the output of the fuel cell 111 is consumed only for the auxiliary power. Although regeneration was not executed during the deceleration mode in the test run for the clarity of explanation, approximately 2.6 kilowatts may be regenerated on the average during the deceleration mode (in the time period from 34 seconds to 62 seconds).

When regeneration is executed, it is preferable to have the smaller preset value M for the output of the fuel cell 111 which is used for charging the secondary battery in the cruising mode M82. Alternatively, the secondary battery is not fully charged but to a certain charge volume determined by subtracting a regenerative power from the preset value S of the secondary battery 131. The residual charge volume is filled with the regenerative power. Consumption of hydrogen in the electric vehicle can effectively be reduced by such regeneration.

The air-conditioning apparatus 120 works in the following manner in the running modes M81 through M84. The cooling power generated in forcible discharge of hydrogen from the hydrogen-storage alloy is used for air-conditioning as described previously. In the test run, the maximum cooling output, approximately 12 kw, was obtained in the acceleration mode M81. The mean cooling output of all the running modes was approximately 2.5 kw in average.

Although the charging capacity of the secondary battery 131 was wet according to the supply of hydrogen in the fuel cell 111 in the experiment, the charging capacity of the secondary battery 131 may be determined according to the operation of air-conditioning. In a preferable example, the charging capacity is set equal to 70 through 80 percents of the preset value S.

When the cooling output is significantly smaller than the cooling load and when no cooling power is accumulated in the heat storage tank 125, the spouting pressure of the hydrogen compressor 112 is heightened to enhance the amount of hydrogen supply into the fuel cell 111 and thereby increase the cooling power generated by the MH storage tank 110. The secondary battery 131 is then charged with an excess of the output of the fuel cell 111 with respect to the required power. The amount of power generation in charging the secondary battery 131 is set appropriately by taking account of the preset value S of the secondary battery 131.

The combined system 101 of the second embodiment is compared with a conventional system, which drives the electric vehicle with a fuel cell and has an air-conditioning apparatus with a vapor compression heat pump driven by outputs of the fuel cell and using a chlorofluorocarbon as a refrigerant. In the conventional system, the fuel cell is driven at a fixed output and discharging from a secondary battery is used to make up for a deficiency of a required power. The conventional system regulates heat applied to a hydrogen-storage alloy so as to control discharge of hydrogen supplied to the fuel cell.

The fuel cell of the conventional system had an output of 10 kw, which is a little greater than the mean required power of approximately 9.5 kw in the running modes M81 through M84. The secondary battery for supplementing the deficient power had a charging capacity of 18 kwh to give a maximum required power.

The secondary battery of the conventional system requires a charging capacity of substantially twice that of the secondary battery 131 of the second embodiment, and thereby has an additional weight of approximately 250 kg. The fuel cell of the conventional system has the smaller power and thereby has a weight less than that of the fuel cell 111 of the second embodiment by approximately 130 kilograms. The total weight of the secondary battery and the fuel cell of the conventional system is accordingly greater than that of the combined system 101 of the second embodiment by approximately 120 kilograms.

Figure 9:
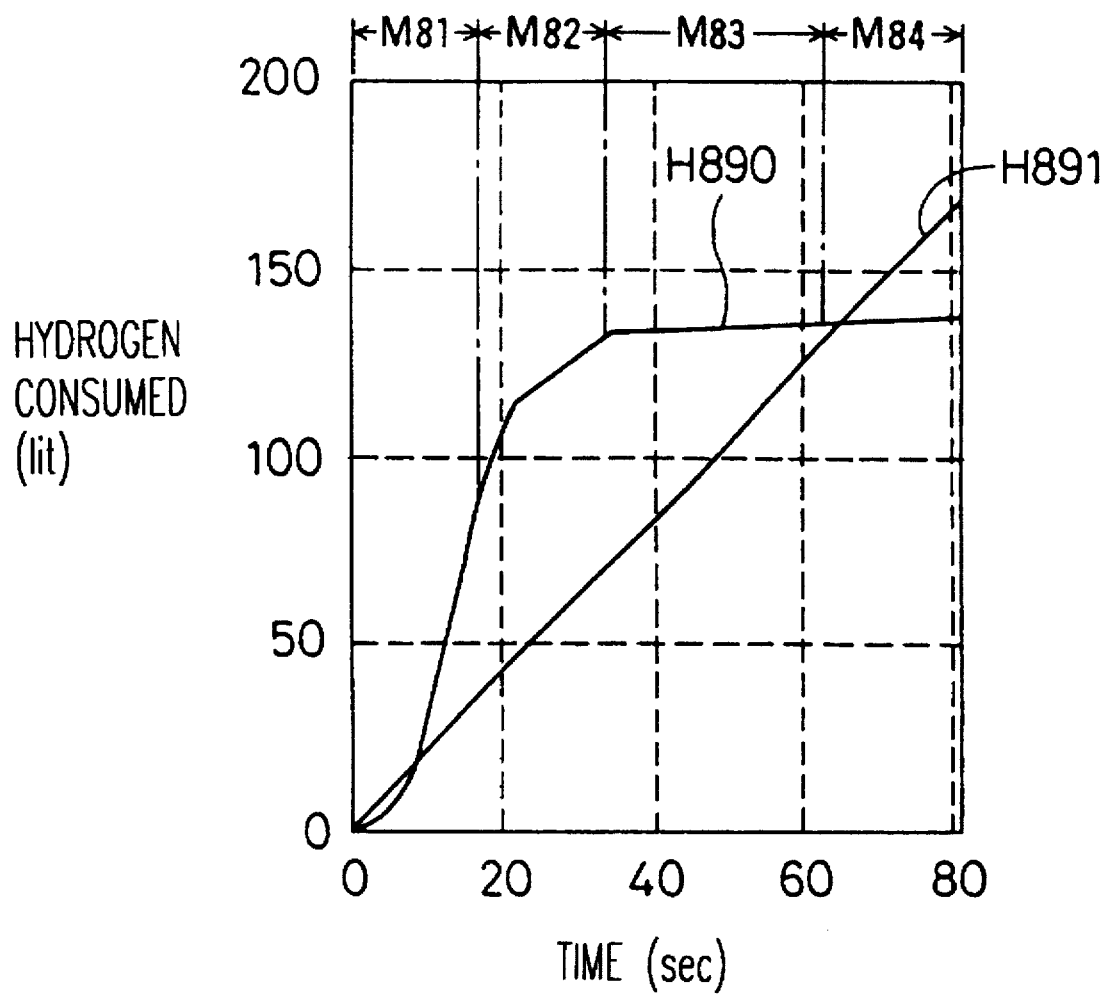
FIG. 9 is a graph showing hydrogen consumption of the combined system 101 of the second embodiment compared with that of a conventional system in the test run.

FIG. 9 is a graph showing hydrogen consumption of the combined system 101 of the second embodiment compared with that of the conventional system in the test run. A first hydrogen consumption curve H890 represents the amount of hydrogen consumption by the combined system 101 of the second embodiment whereas a second hydrogen consumption curve H891 represents the same by the conventional system. As illustrated in FIG. 9, the first hydrogen consumption curve H890 of the combined system 101 abruptly increases in the acceleration mode M81, gradually increases at a fixed consumption rate per unit time in the cruising mode M82, and becomes substantially plateau (a very little increase at a fixed low consumption rate) in the deceleration mode M83 and the stop mode M84. The accelerating increase of hydrogen consumption in the acceleration mode M81 is ascribed to operation of the fuel cell 111 at an output corresponding to the required power. The second hydrogen consumption curve H891 of the conventional system increases at a fixed consumption rate irrespective of the running mode. In the acceleration mode M81, the hydrogen consumption by the combined system 101 is greater than that by the conventional system. After completion of all the running modes, however, the conventional system consumes the greater amount of hydrogen than the combined system 101. In the experiment, the difference in the total hydrogen consumption was approximately 50 liters (20%).

The conventional system varies the amount of hydrogen discharged from the hydrogen-storage alloy by heating the hydrogen-storage alloy. The combined system 101, on the other hand, quickly varies the amount of hydrogen supply into the fuel cell 111 by means of the hydrogen compressor 112, thereby realizing the excellent responsiveness to the loading of the fuel cell 111.

In a subsequent experiment, electric vehicles with the combined system 101 of the second embodiment and with the conventional system respectively mounted thereon were run at a cruising speed of 60 km/h. For the simplicity of comparison, the output of the fuel cell 111 and the charging capacity of the secondary battery 131 of the combined system 101 were set equal to those of the conventional system (output: 10 kw; charging capacity 18 kwh).

A total power required for driving the electric vehicle at the cruising speed of 60 km/h and cooling the air (3 kw in the experiment) was approximately 10.5 kw for the combined system 101 and approximately 12 kw for the conventional system. The amount of hydrogen consumption for the required power was approximately 135 liters/minute for the combined system 101 and approximately 190 liters/minute for the conventional system.

As described previously, the MH storage tank 110 filled with 100 kg of the MmNi alloy was mounted on the electric vehicle to store hydrogen of approximately 20 square meters. A possible travel distance at the cruising speed of 60 kg/h was approximately 150 km for the electric vehicle with the combined system 101 and approximately 110 km for the vehicle with the conventional system. The combined system 101 accordingly increased the possible travel distance of the electric vehicle by approximately 36 percents, compared with the conventional system.

As described above in detail, the combined system 101 of the fuel cell and the air-conditioning apparatus cools the air in the room of the electric vehicle with the cooling power generated by the MH storage tank 110, thus realizing high energy efficiency and effectively reducing the size and weight of the whole system. This results in the longer travel distance of the electric vehicle. The combined system 101 of the second embodiment does not use any chlorofluorocarbons and accordingly does not require specific measures for preventing leakage of chlorofluorocarbons. In the combined system 101, hydrogen compressed by the hydrogen compressor 112 is supplied into the fuel cell 111. This preferably enhances the responsiveness to the variation in loading of the fuel cell 111.

When the free pressure of the hydrogen-storage alloy is greater than the operating pressure of the fuel cell, the hydrogen compressor 112 is inactivated and hydrogen is supplied directly via the by-pass 114 into the fuel cell 111. This effectively shortens the operation time of the hydrogen compressor 112 for energy saving.

In the combined system 101 of the second embodiment, the secondary battery 131 is charged with an excess of the output of the fuel cell 111 with respect to the required power. The excess power may, however, be used for cooling a heat-producing apparatus and heating a heat-absorbing apparatus by means of thermoelectric converters. A combined system 201 of a fuel cell and an air-conditioning apparatus having such a structure with thermoelectric converters is described according to the block diagram of FIG. 10. The combined system 201 includes thermoelectric converter means and a heater 126 other than the elements of the combined system 101 of the second embodiment. The same elements as those of the combined system 101 are expressed by the same numerals and not explained here.

Figure 10:
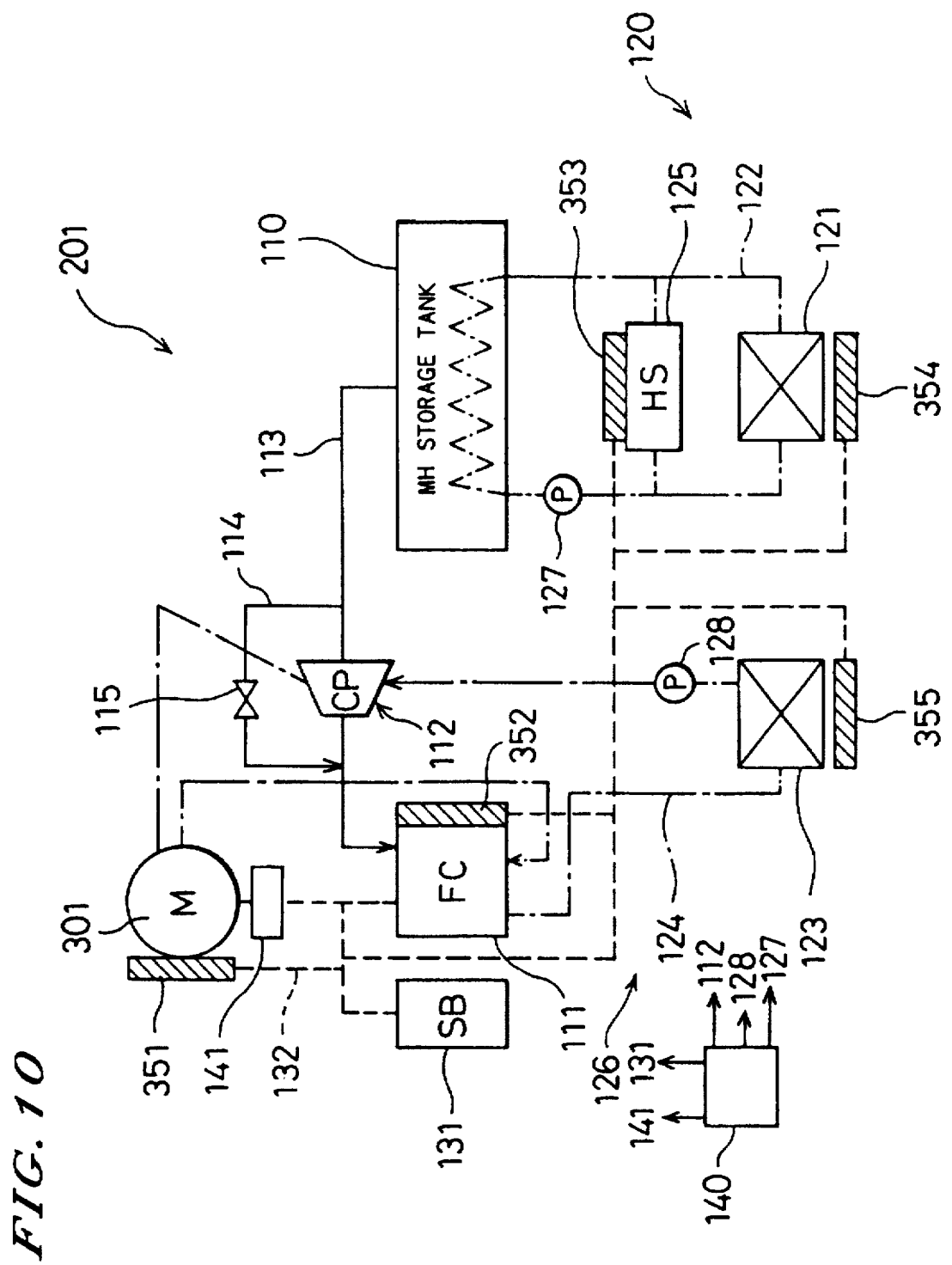
FIG. 10 is a block diagram showing a fundamental structure of a combined system 201 of a fuel cell and an air-conditioning apparatus mounted on an electric vehicle, as modification of the second embodiment.

As illustrated in FIG. 10, the combined system 201 includes the heater 126 for heating the room of the electric vehicle. The heater 126 includes a heat exchanger 123 for heating the air in the electric vehicle, a heating medium conduit 124 running through the heat exchanger 123, the hydrogen compressor 112, the motor 301, and the fuel cell 111, a pump 128 for circulating a heating medium, such as water, passing through the heating medium conduit 124, and a fan (not shown) for feeding the heated air into the room of the electric vehicle via the heat exchanger 123. The heater 126 supplies heat generated by the hydrogen compressor 112, the motor 301, and the fuel cell 111 to the heat exchanger 123 in the form of the heating medium passing through the heating medium conduit 124. The path of the heating medium conduit 124 is shown as dash-and-dotted line in FIG. 10. The heat exchanger 123 exchanges the heat thus supplied with the air in the room of the electric vehicle to raise the room temperature. The pump 128 is connected to the controller 140 and adjusts the flow of the heating medium running through the heat exchanger 123 based on control signals output from the controller 140.

An output terminal of the fuel cell 111 is coupled with thermoelectric converter means 351 through 355 via the conductive line 132. The thermoelectric converter means 351 through 354 are respectively arranged in parallel with the motor 301, the fuel cell 111, the heat exchanger 121, and the heat storage tank 125 to cool the corresponding elements. The thermoelectric converter means 355 is disposed in parallel with the heat exchanger 123 to heat the heat exchanger 123.

The thermoelectric converter means 351 through 355 are excited by an excess power of the fuel cell 111 or a regenerated power of the motor 301 to convert the electric power to heat or the cooling power. The thermoelectric converter means 351 through 354 cool the motor 301, the fuel cell 111, the heat exchanger 121, and the heat storage tank 125 while the thermoelectric converter means 355 heats the heat exchanger. The thermoelectric converter means can utilize the excess power of the fuel cell 111 after completion of charging the secondary battery 131 to save valuable energy.

The combined system 201 with the thermoelectric converter means uses an excess power of the fuel cell 111 to cool the heat-producing devices such as the motor 301 and the fuel cell 111 and to heat or cool the air in the room of the electric vehicle. The combined system 201 specifically utilizes an excess power after completion of charging the secondary battery 131. This enhances the energy efficiency and effectively increases a possible travel distance of the electric vehicle.

Figure 11:
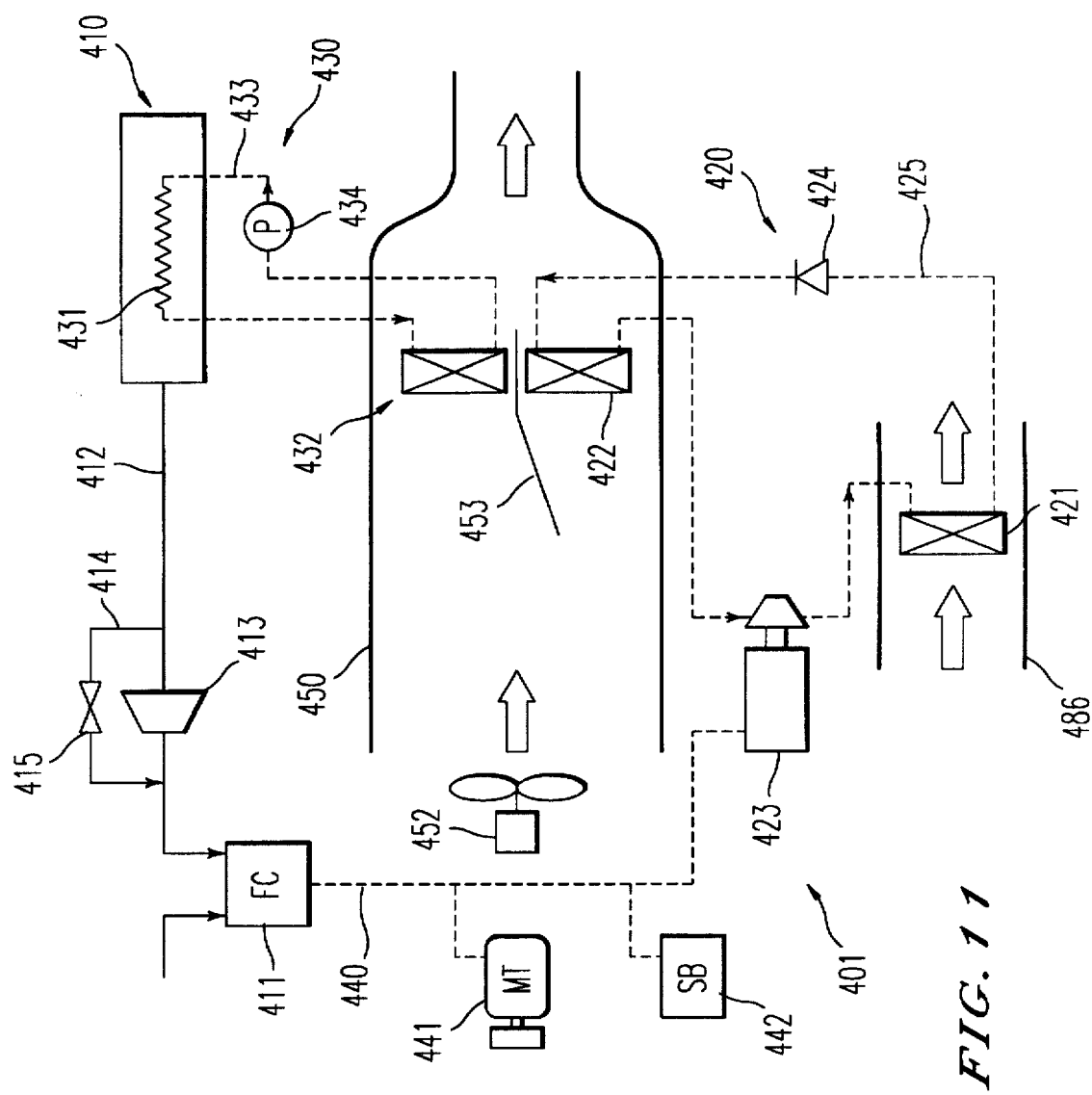
FIG. 11 is a block diagram showing a fundamental structure of a combined system 401 of a fuel cell and an air-conditioning apparatus mounted on an electric vehicle, as a third embodiment in accordance with the invention.

Still another combined system 401 of a fuel cell and an air-conditioning apparatus mounted on an electric vehicle is explained as a third embodiment of the invention based on the block diagram of FIG. 11.

As illustrated in FIG. 11, the combined system 401 of the third embodiment includes a motor 441 for driving the electric vehicle, a fuel cell 411 for generating power with hydrogen and oxygen used as fuels and supplying a required power to the motor 441 and other electric devices mounted on the electric vehicle, an air-conditioning apparatus 420 for cooling the air in the room of the electric vehicle, a heat exchanger unit 430 for cooling the air in the electric vehicle, a metal hydrides storage tank 410 (hereinafter referred to as MH storage tank) for supplying hydrogen to the fuel cell 411 and absorbing heat for air-cooling operation of the heat exchanger unit 430, and a controller 490 (see FIG. 12) for regulating the power supply to the motor 441 and controlling operations of the fuel cell 411 and the air-conditioning apparatus 420.

The MH storage tank 410 includes a hydrogen-storage alloy identical with those contained in the first through the eighth metal hydrides storage tanks 11 through 18 in the first embodiment. The MH storage tank 410 connects with the fuel cell 411 via a hydrogen supply conduit 412, which is provided with a hydrogen compressor 413 or another pressure-type hydrogen feeder. The hydrogen compressor 413 is connected to the controller 490 to be driven in response to control signals output from the controller 490, and supplies hydrogen sucked out of the hydrogen-storage alloy in the MH storage tank 410 into the fuel cell 411. The hydrogen supply conduit 412 has a bypass 414 detouring the hydrogen compressor 413. A control valve 415 is disposed in the bypass 414 for opening and closing the bypass 414. Hydrogen stored in the MH storage tank 410 can be supplied into the fuel cell 411 not via the hydrogen compressor 413 but directly through the bypass 414 by opening the control valve 415.

The heat exchanger unit 430 includes a first heat exchanger 431 placed in the MH storage tank 410 and a second heat exchanger 432 installed in a duct 450 constituting an air passage in the room of the electric vehicle. The first heat exchanger 431 and the second heat exchanger 432 are connected with each other via a heating medium conduit 433 forming a circulation path. The heating medium conduit 433 is provided with a pump 434 for circulating a heating medium, such as water and brine. The heat exchanger unit 430 drives the pump 434 to circulate the heating medium, and exchange the cooling power generated in forcible discharge of hydrogen from the hydrogen-storage alloy in the MH storage tank 410 with the air heat flowing through the duct 450 via the first heat exchanger 431 and the second heat exchanger 432. The MH storage tank 410 accordingly receives the heat required for forcible discharge of hydrogen from the hydrogen-storage alloy whereas the duct 450 receives the cooling power required for cooling the room of the electric vehicle.

The fuel cell 411 receives the air supplied from a vent as well as hydrogen sucked out of the hydrogen-storage alloy in the MH storage tank 410 and supplied via the hydrogen supply conduit 412, and generates power through electrochemical conversion.

An output of the fuel cell 411 is connected to the motor 441, a secondary battery 442, and a compressor 423 of the air-conditioning apparatus 420 via a conductive line 440. The secondary battery 442 connecting with the controller 490 receives control signals output from the controller 490 to be charged with an excess power of the fuel cell 411 and discharge to compensate for a deficiency of the output of the fuel cell 411.

The air-conditioning apparatus 420 works as a vapor compression refrigerator using chlorofluorocarbons as a refrigerant. The air-conditioning apparatus 420 includes a compressor 423 for pressurizing the refrigerant, a capacitor 421 functioning as a heat exchanger for cooling the pressurized refrigerant, an expansion valve 424 for expanding the refrigerant, and an evaporator 422 for heat-exchanging the refrigerant cooled by the expansion with the air in the room of the electric vehicle. The compressor 423, the capacitor 421, the expansion valve 424, and the evaporator 422 are coupled with one another by a refrigerant conduit 425 forming a circulation path. The capacitor 421 is disposed in a path 486 of cooling air and cools the refrigerant heated by the compression. The compressor 423 connects with the controller 490 and is driven by driving signals output from the controller 490. The evaporator 422 is arranged across a damper 453 opposite to the second heat exchanger 432 of the heat exchanger unit 430 placed in the duct 450.

The duct 450 includes a fan 452 for feeding the air into the room of the electric vehicle as well as the evaporator 422 of the air-conditioning apparatus 420 and the second heat exchanger 432 of the heat exchanger unit 430 disposed opposite to each other via the damper 453. The air flowing through the duct 450 is cooled by the second heat exchanger 432 or the evaporator 422 and fed into the room by means of the fan. The damper 453 connecting with the controller 490 receives driving signals output from the controller 490 and arbitrarily determines a ratio of an air intake into the second heat exchanger 432 to the same into the evaporator 422.

Figure 12:
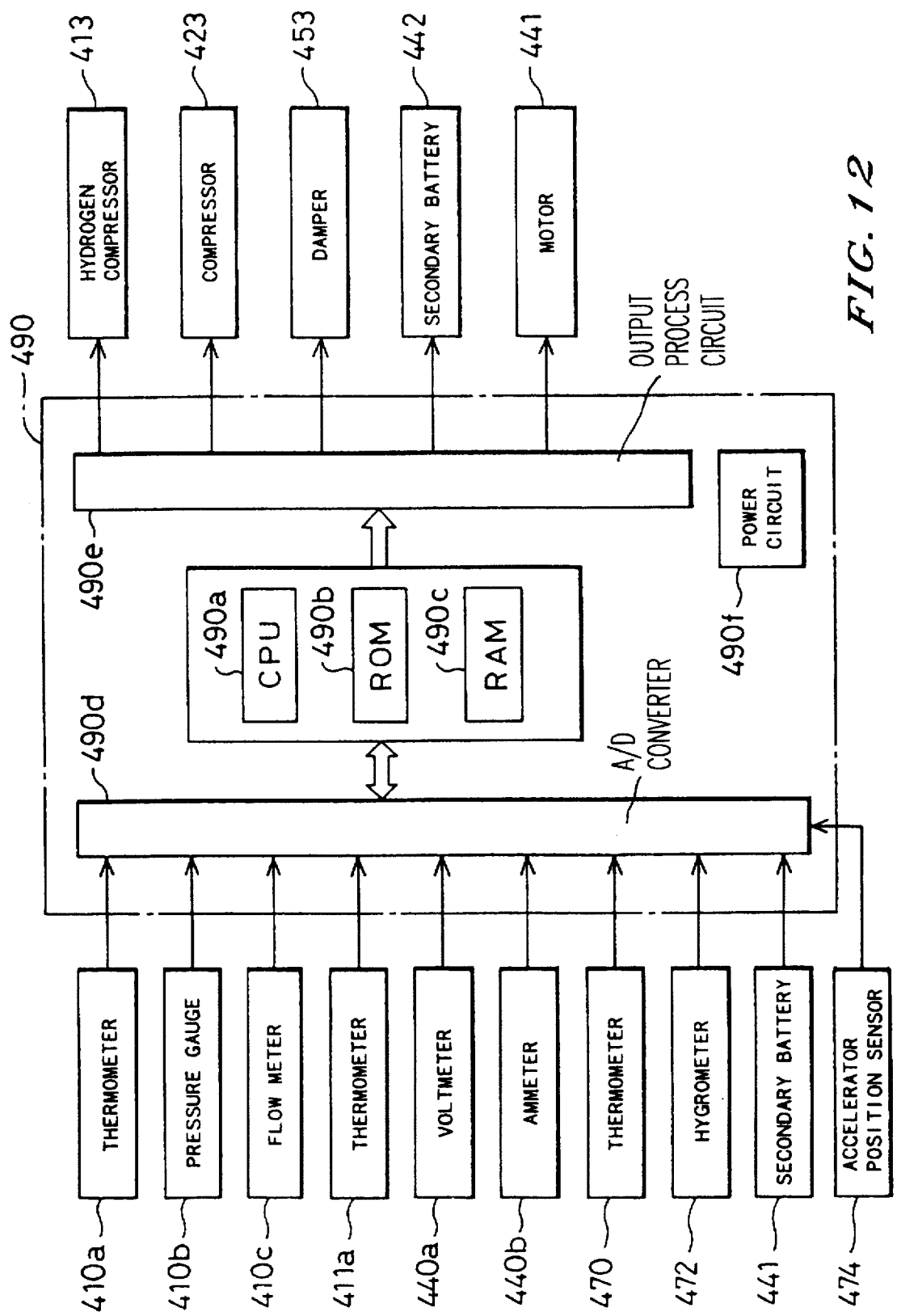
FIG. 12 is a block diagram showing an electric structure of a control system including a controller 490 in the combined system of the third embodiment.

The combined system 401 of the third embodiment includes a variety of measuring instruments and apparatus as illustrated in the block diagram of FIG. 12. The MH storage tank 410 is provided with a thermometer 410a for measuring the temperature in the MH storage tank 410, a pressure gauge 410b for measuring the in-tank pressure, and a flow meter 410c for measuring the flow of hydrogen sucked out of the MH storage tank 410. The fuel cell 411 includes a thermometer 411a for measuring the temperature in the fuel cell 411. A voltmeter 440a and an ammeter 440b for measuring outputs of the fuel cell 411 are arranged on a conductive line 440. A thermometer 470 for measuring the room temperature of the electric vehicle and a hygrometer 472 for measuring the interior humidity of the electric vehicle are installed in the electric vehicle. The secondary battery 442 has a hydrometer (not shown) for measuring the charge volume, and a voltmeter and an ammeter (either not shown) for measuring the power in charging or discharging. Other measuring instruments and apparatus installed in the electric vehicle include a speedometer (not shown), an accelerator position sensor 474, and an accelerometer (not shown) required for controlling the electric vehicle.

With further reference to FIG. 12, the controller 490 has a structure similar to that of the controller 10 of the first embodiment, and includes a CPU 490a for executing a variety of operations, a ROM 490b, a RAM 490c, an A/D converter 490d for receiving detection signals from the measuring instruments and apparatus described above, and an output process circuit 490e for receiving the results of operations executed by the CPU 490a and outputting driving signals to the hydrogen compressor 413, the compressor 423, the damper 453, the secondary battery 442, and the motor 441. The controller 490 further includes a power circuit 490f, which supplies a required voltage to each of the various elements described above. The controller 490 thus constructed regulates operations of the combined system 401 of the third embodiment.

Figure 5:
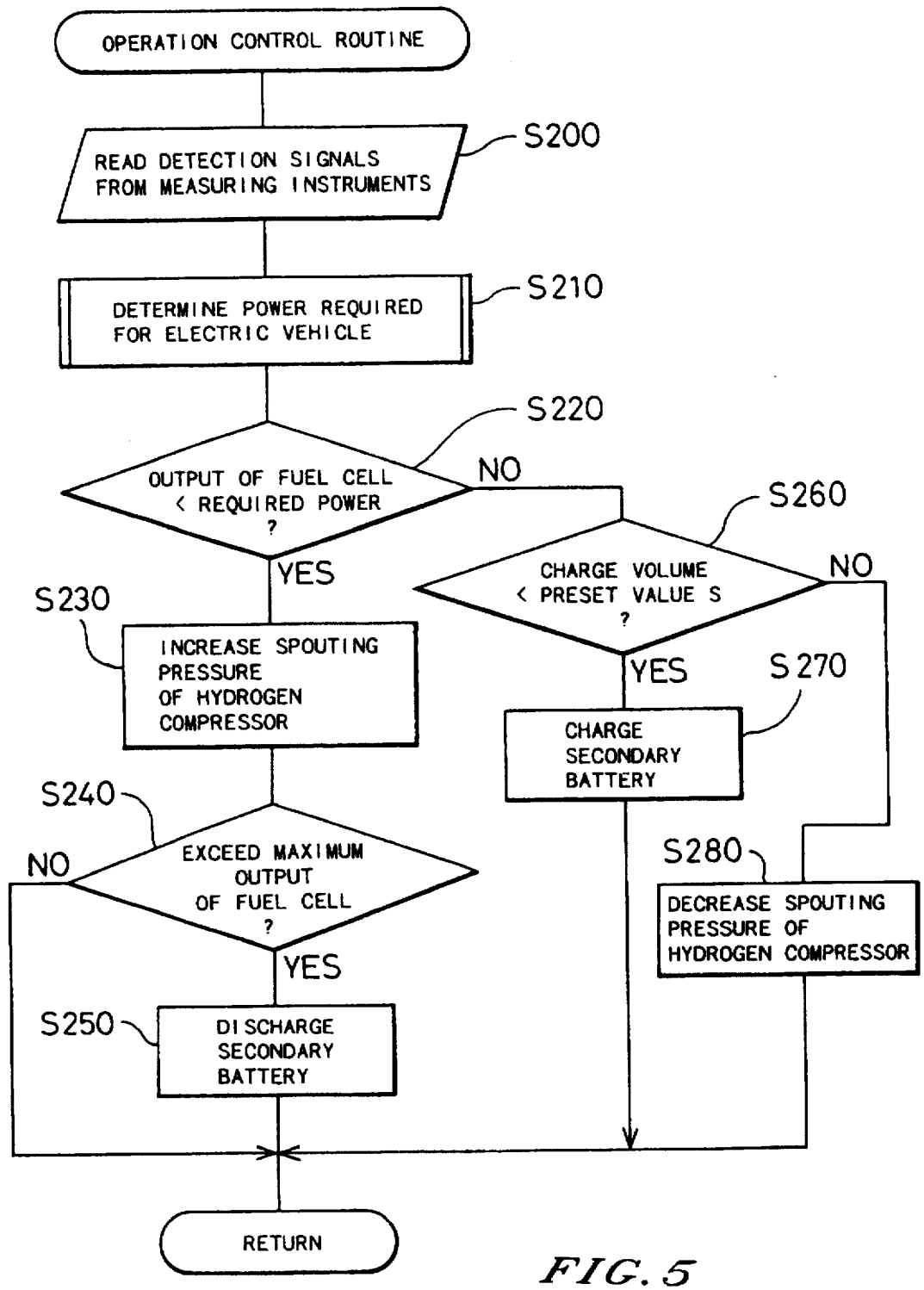
FIG. 5 is a flowchart illustrating an operation control routine executed by the controller 140 for driving and controlling a hydrogen compressor and a secondary battery.

Running control of the combined system 401 of the third embodiment having the above structure follows the operation control routine of the hydrogen compressor and the secondary battery executed by the controller 140 of the combined system 101 of the second embodiment as shown in the flowchart of FIG. 5. The running control of the combined system 401 is accordingly not explained here in detail.

Figure 13:
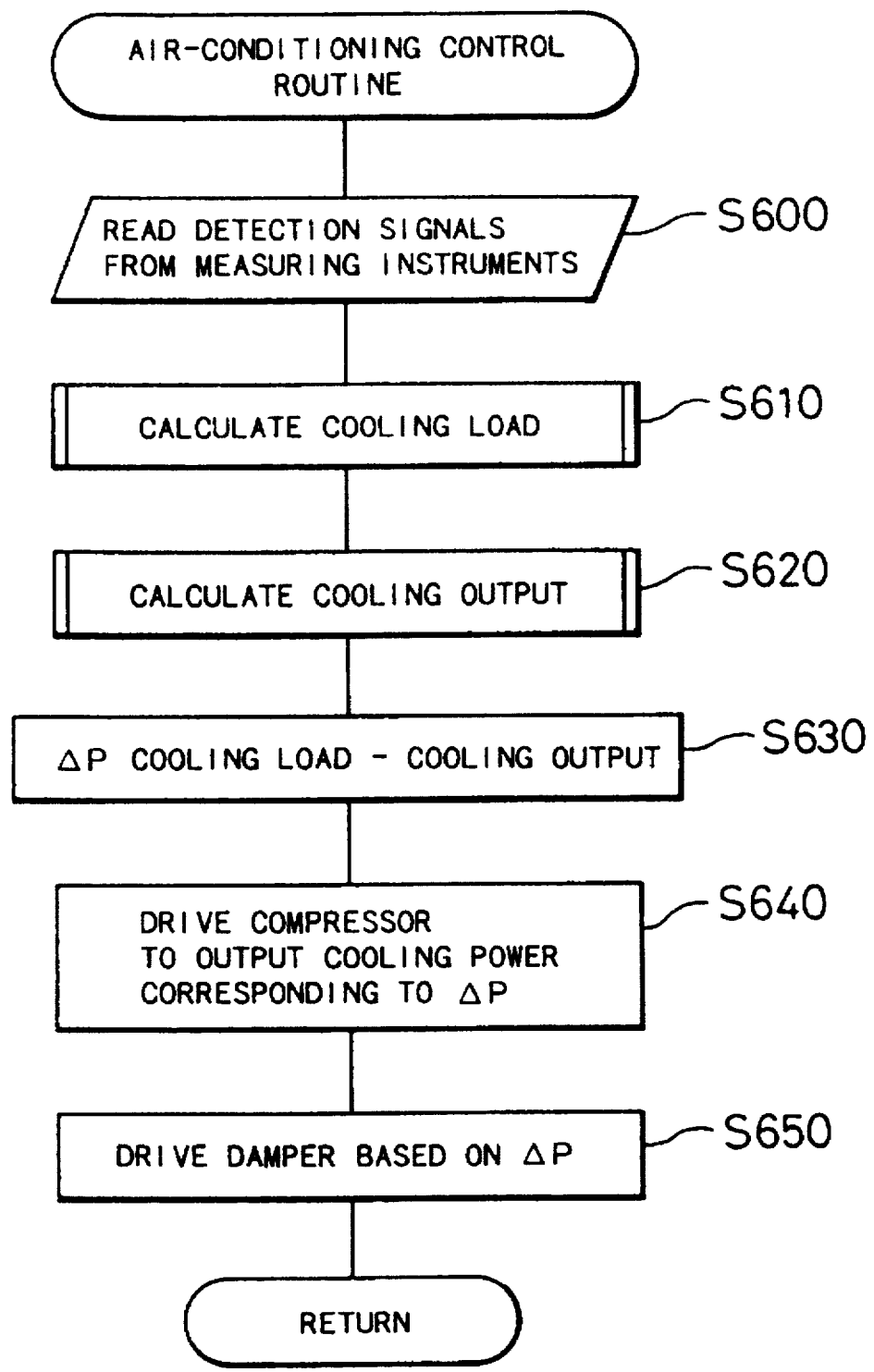
FIG. 13 is a flowchart showing an air-conditioning control routine executed by the controller 490.

The room of the electric vehicle is cooled with the cooling power generated by the air-conditioning apparatus 420 and accompanied with forcible discharge of hydrogen from the hydrogen-storage alloy. Air conditioning by the combined system 401 is described according to an air-conditioning control routine shown in the flowchart of FIG. 13. The air-conditioning control routine is executed by the CPU 490a at predetermined time intervals, for example, at every 10 milliseconds. When the program enters the routine, the CPU 490a receives detection signals output from the various measuring instruments and apparatus via the A/D converter 490d at step S600. The detection signals read by the CPU 490a include: those output from the thermometer 470 for measuring the room temperature of the electric vehicle; those from the hygrometer 472 for measuring the interior humidity; those from the thermometer 411a, the voltmeter 440a, and the ammeter 440b for detecting outputs of the fuel cell 411; and those from the hydrometer, the voltmeter, and the ammeter (not shown) for detecting charging conditions of the secondary battery 442. At step S610, the CPU 490a determines a cooling load required to make the room temperature read at step S600 equal to a target temperature. At subsequent step S620, the CPU 490a determines an amount of hydrogen sucked out of the hydrogen-storage alloy based on the outputs of the fuel cell 411, calculates a cooling power generated in the MH storage tank 410 for the discharge amount of hydrogen, and determines a calorie used for cooling the air (hereinafter referred to as the cooling output) according to the cooling power.

A deficient load ΔP is then determined by subtracting the cooling output from the cooling load at step S630. The program proceeds to step S640 at which the compressor 423 is driven to allow the air-conditioning apparatus 420 to output a cooling power corresponding to the deficient load ΔP. The CPU 490a then drives the damper 453 to determine a ratio of an air intake into the second heat exchanger 432 to that into the evaporator 422 based on the cooling output and the deficient load ΔP at step S650.

Electric vehicles with the combined system 401 of the third embodiment and with a conventional system respectively mounted thereon were run at a cruising speed of 40 km/h. The conventional system drives the electric vehicle with a fuel cell and has an air-conditioning apparatus with a vapor compression heat pump driven by outputs of the fuel cell and using a chlorofluorocarbon as a refrigerant. In the conventional system, the fuel cell is driven at a fixed output and discharging from a secondary battery is used to make up for a deficiency of a required power. The conventional system regulates heat applied to a hydrogen-storage alloy so as to control discharge of hydrogen supplied to the fuel cell.

The combined system 401 used in the experiment had the following settings. The MH storage tank 410 mounted on the electric vehicle was filled with 100 kilograms of an MmNi hydrogen-storage alloy, and the fuel cell 411 had a maximum output of 10 kilowatts. A lead-acid battery having a charging capacity of 15 kwh was used for the secondary battery 442. The total weight of the electric vehicle including a driver was 1.6 tons.

In the electric vehicle with the combined system 401, a total power (driving force+auxiliary power) required for driving the electric vehicle at the cruising speed of 40 km/h and cooling the air was approximately 6.7 kw whereas the amount of hydrogen consumption for the required power was approximately 66 liters/minute. The cooling power obtained by discharge of hydrogen from the hydrogen-storage alloy was 1.45 kw. When the calorie usable for air-cooling by the second heat exchanger 432 was set equal to 1.2 kw, the air intake divided by the damper 453 to be flown into the second heat exchanger 432 of the electric vehicle with the combined system 401 was approximately 22 percents of the whole air flow.

Figure 14:
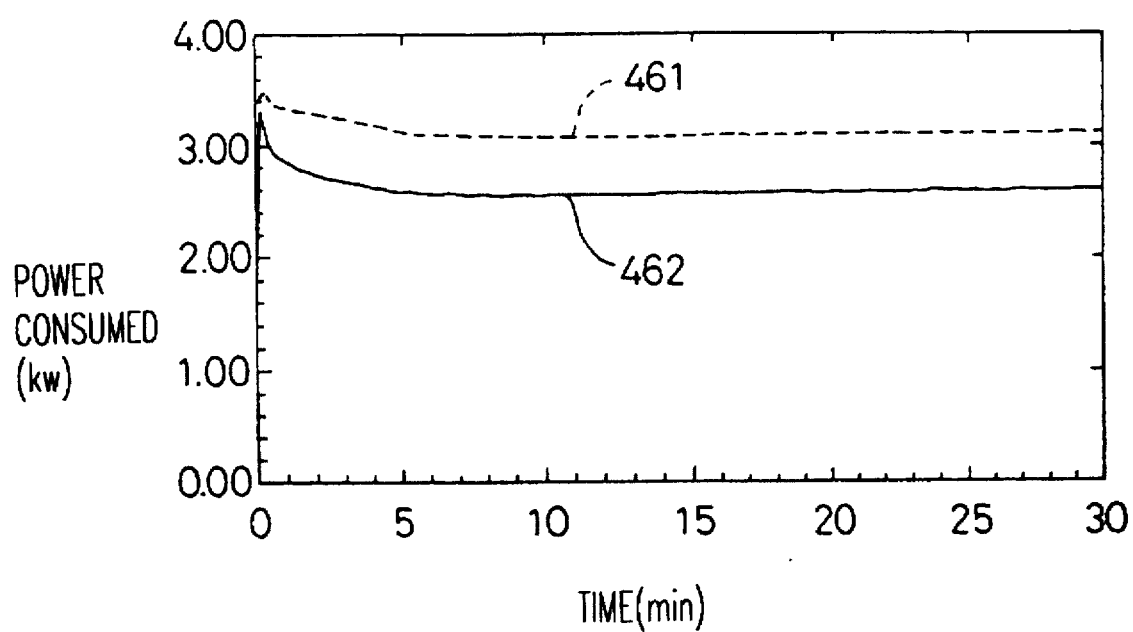
FIG. 14 is a graph showing a variation in the power consumed by air-conditioning of the electric vehicle having the combined system 401 mounted thereon.

FIG. 14 is a graph illustrating variations in the power consumed for cooling the outside air of 35° C. introduced into the room of the electric vehicle. A first curve 461 represents the power consumed for air-cooling in the electric vehicle with the conventional system plotted against the time whereas the second curve 462 represents the same in the electric vehicle with the combined system 401. As clearly shown in FIG. 14, the power consumed for air-cooling was approximately 3.2 kw for the electric vehicle with the conventional system and approximately 2.6 kw for the vehicle with the combined system 401. It means that the combined system 401 can reduce the power consumed for air-cooling by approximately 20 percents. The combined system 401 also improves a possible travel distance by approximately 12 percents. In the above experiment, both the electric vehicles showed similar cooling performance.

As described above in detail, the combined system 401 of the third embodiment utilizes the cooling power generated by the MH storage tank 410 for cooling the air in the electric vehicle. The structure of the embodiment using both the air-conditioning apparatus 420 and the heat exchanger unit 430 for air-cooling operation effectively generates a cooling output corresponding to a cooling load without generating an excessive power greater than the cooling load. This enhances the energy efficiency and improves a possible travel distance of the electric vehicle.

Hydrogen is sucked out of the hydrogen-storage alloy in the MH storage tank 410 and supplied into the fuel cell 411 by means of the hydrogen compressor 413. The spouting pressure of the hydrogen compressor 413 is varied in response to the variation in loading applied onto the electric vehicle. The output of the fuel cell 411 can thus be varied quickly in response to the variation in loading of the electric vehicle.

In the combined system 401 of the third embodiment, the second heat exchanger 432 of the heat exchanger unit 430 and the evaporator 422 of the air-conditioning apparatus 420 are arranged in parallel with each other inside the duct 450. The damper 453 distributes the air between the second heat exchanger 432 and the evaporator 422. In another preferable structure, however, the second heat exchanger 432 and the evaporator 422 may be disposed against the air flow in series in the duct 450. Either one of the heat exchanger 432 and the evaporator 422 is arranged up the other in this alternative structure. This structure does not require distribution of the air intake by the damper 453 according to the deficient load ΔP or the difference between the cooling load and the cooling output generated by the MH storage tank 410.

In still another possible structure, the second heat exchanger 432 is not placed inside the duct 450 but is arranged up the capacitor 421 of the air-conditioning apparatus 420 to cool the air exchanged with the capacitor 421. A combined system 501 having such a structure is illustrated in the block diagram of FIG. 15. The combined system 501 has an identical structure with that of the combined system 401 of the third embodiment except the position of the second heat exchanger 432 and the design of a duct 550 altered according to the position of the second heat exchanger 432. The same elements as those of the combined system 401 are expressed by the same numerals and not explained here.

Figure 15:
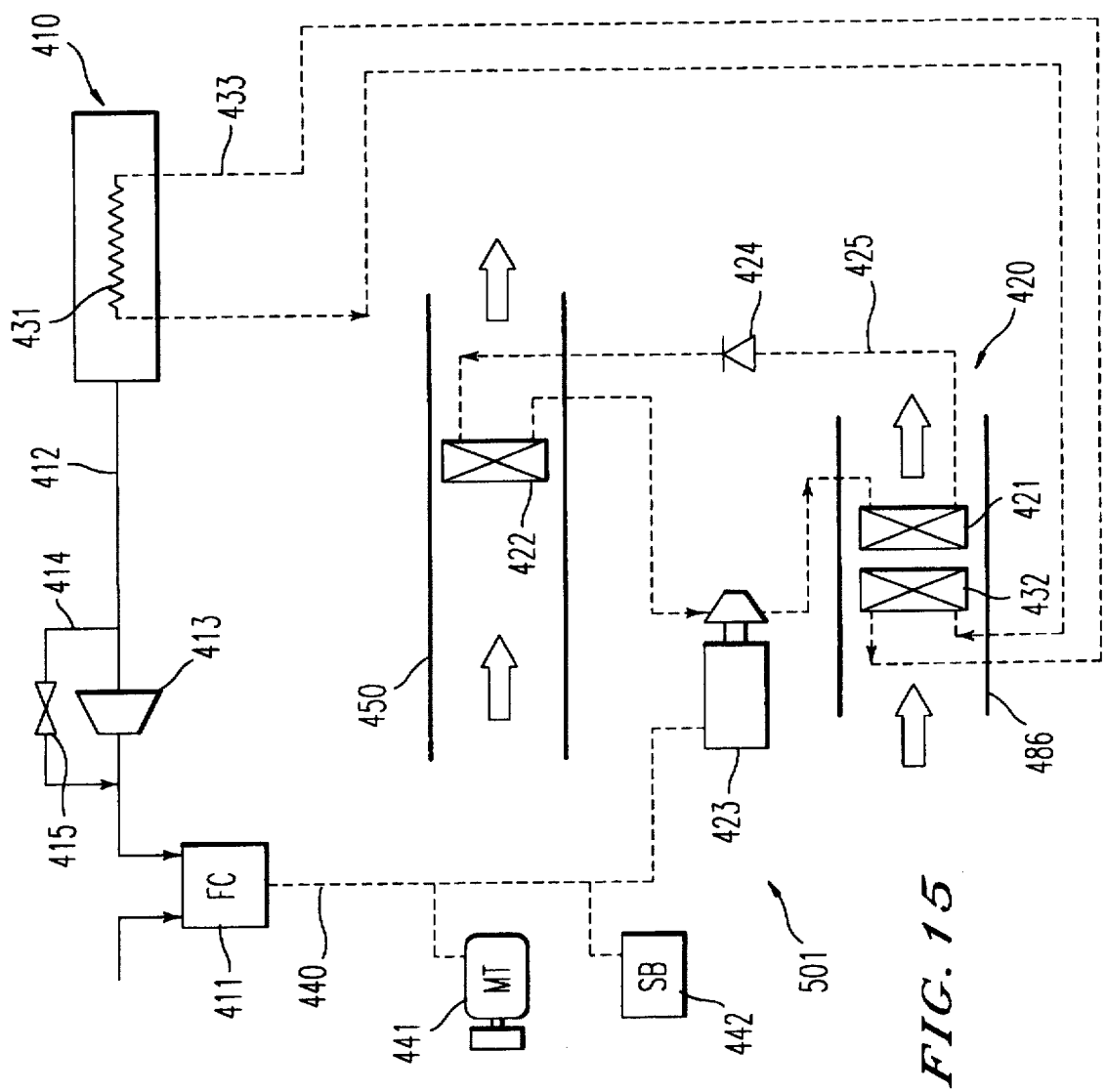
FIG. 15 is a block diagram showing a fundamental structure of a combined system 501 of a fuel cell and an air-conditioning apparatus mounted on an electric vehicle, as modification of the third embodiment.

In the combined system 501 as illustrated in FIG. 15, the second heat exchanger 432 of the heat exchanger unit 430 is placed in the upstream of the capacitor in an air passage 486 for cooling the capacitor 421 of the air-conditioning apparatus 420. The second heat exchanger 432 of the heat exchanger unit 430 previously cools the air used for cooling the capacitor 421 with the cooling power generated by the MH storage tank 410.

The evaporator 422 of the air-conditioning apparatus 420 is placed inside the duct 550. The combined system 501 uses only the evaporator 422 to cool the air in the room of the electric vehicle and thereby does not have a damper unlike the combined system 401.

Electric vehicles with the combined system 501 and with a conventional system respectively mounted thereon were run at a cruising speed of 40 km/h. The conventional system has an identical structure with that of the conventional system used for comparison with the electric vehicle having the combined system 401.

The combined system 501 used in the experiment had the following settings. The MH storage tank 410 mounted on the electric vehicle was filled with 100 kilograms of an MmNi hydrogen-storage alloy, and the fuel cell 411 had a maximum output of 10.5 kilowatts. A lead-acid battery having a charging capacity of 15 kwh was used for the secondary battery 442. The total weight of the electric vehicle including a driver was 1.6 tons. In the electric vehicle with the combined system 501, a total power (driving force auxiliary power) required for driving the electric vehicle at the cruising speed of 40 km/h and cooling the air was approximately 6.7 kw. This value is substantially the same as the total power required for driving the electric vehicle with the combined system 401 described above. The amount of hydrogen required for the maximum output of the fuel cell 411 was approximately 140 liters/minute.

Figure 16:
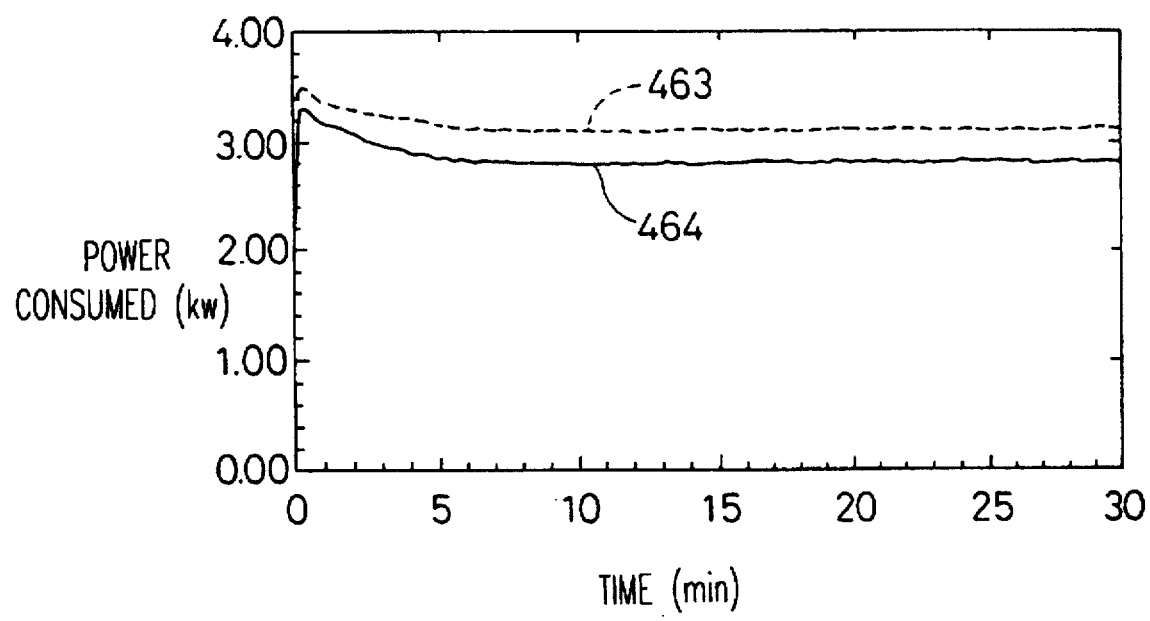
FIG. 16 is a graph showing a variation in the power consumed by air-conditioning of the electric vehicle having the combined system 501 mounted thereon.

FIG. 16 is a graph illustrating variations in the power consumed for cooling the outside air of 35° C. introduced into the room of the electric vehicle. A first curve 463 represents the power consumed for air-cooling in the electric vehicle with the conventional system plotted against the time whereas the second curve 464 represents the same in the electric vehicle with the combined system 501. As clearly shown in FIG. 16, the combined system 501 reduces the power consumed for air-cooling in the electric vehicle by approximately 12 percents compared with the conventional system. The combined system 501 also improves a possible travel distance by approximately 12 percents.

The combined system 501 does not require distribution of the air intake by the damper 453 according to the deficient load ΔP or the difference between the cooling load and the cooling output generated by the MH storage tank 410. The structure allows the cooling power generated by the MH storage tank 410 to be used for air-cooling, thereby enhancing the energy efficiency and improving a possible travel distance of the electric vehicle.

Figure 17:
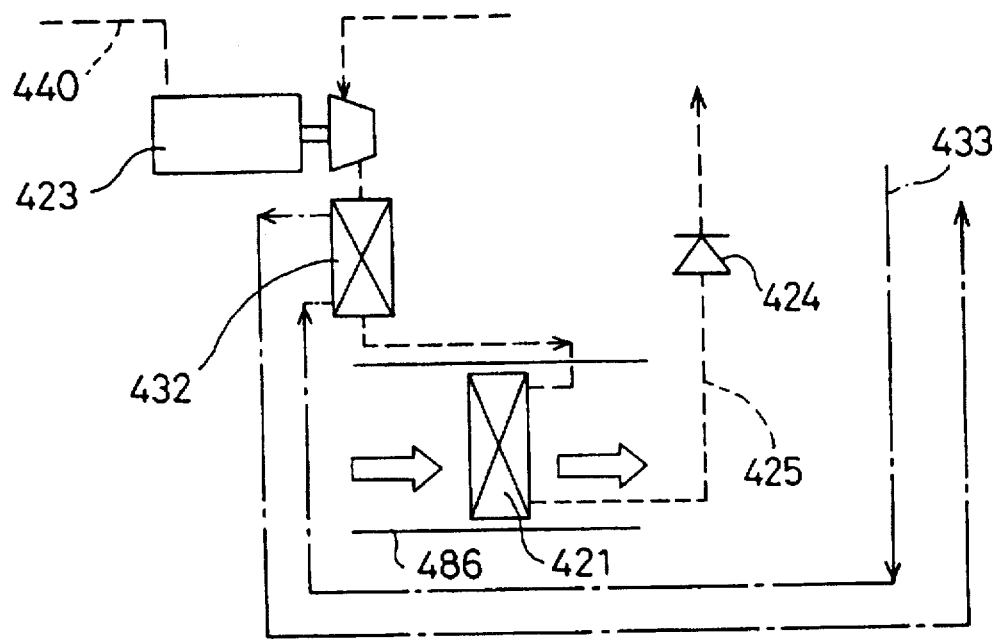
FIG. 17 is a block diagram illustrating one structure in which a second heat exchanger 432 is installed down a compressor 423 and up a capacitor 421.

In another preferable structure, the second heat exchanger 432 of the heat exchanger unit 430 is placed down the compressor 423 in the refrigerant conduit 425 forming a circulation path of the air-conditioning apparatus 420 and up the capacitor 421 as illustrated in FIG. 17. In this structure, the second heat exchanger 432 cools the refrigerant heated through compression by the compressor 423 with the cooling power generated from the MH storage tank 410. This favorably decreases the loading of heat exchange by the capacitor 421, thereby enhancing the cooling efficiency and saving valuable energy.

Figure 18:
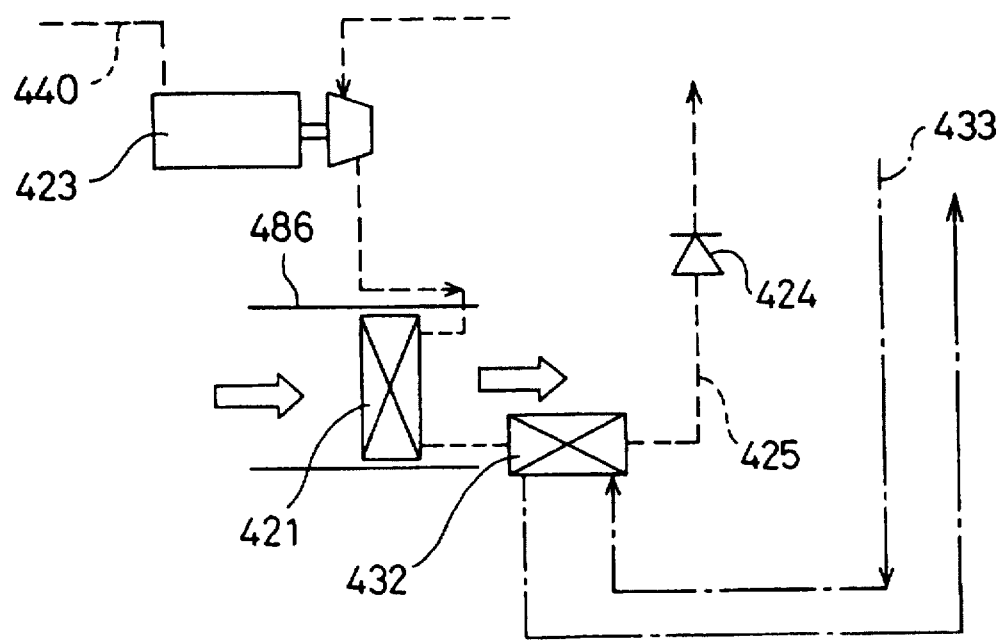
FIG. 18 is a block diagram illustrating another structure in which the second heat exchanger 432 is installed down the capacitor 421 and up an expansion valve 424.

The second heat exchanger 432 may alternatively be placed down the capacitor 421 in the refrigerant conduit 425 forming a circulation path of the air-conditioning apparatus 420 and up the expansion valve 424 as illustrated in FIG. 18. This structure allows the second heat exchanger 432 to further cool the refrigerant previously cooled by the capacitor 421 with the cooling power generated from the MH storage tank 410, thus enhancing the cooling efficiency and saving valuable energy.

Figure 19:
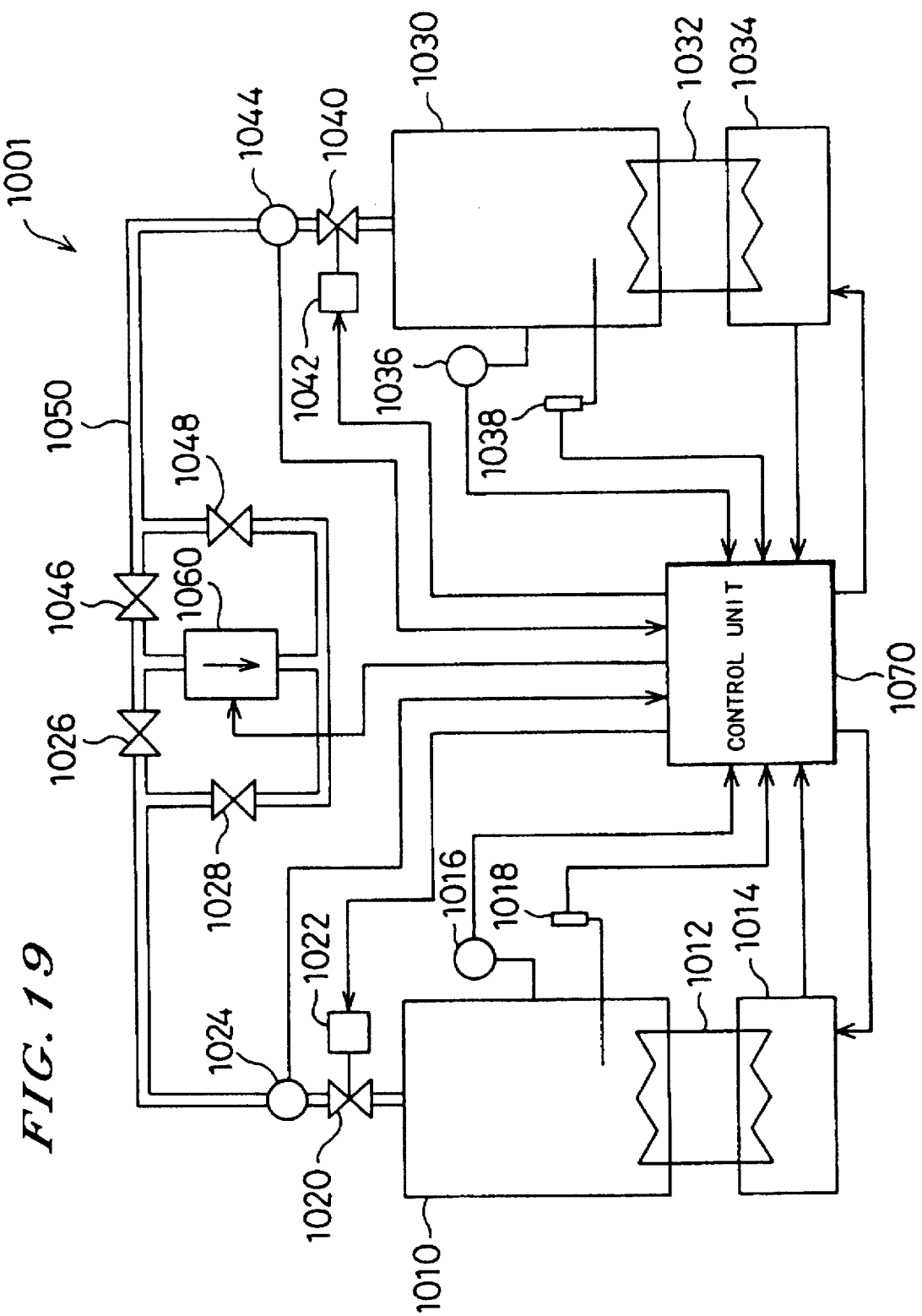
FIG. 19 is a block diagram schematically showing a first system control unit applied to a heat pump 1001.

An abnormal detection unit and a control unit may be applicable to the combined systems of the fuel cell and the air-conditioning apparatus of the first through the third embodiments described above. FIG. 19 is a block diagram illustrating a system control unit having both functions of the abnormal detection unit and the control unit applied to a heat pump 1001 with two metal hydrides storage tanks.

The heat pump 1001 includes first and second metal hydrides storage tanks (hereinafter referred to as MH storage tanks) 1010 and 1030 filled with hydrogen-storage alloys, a pipe 1050 for connecting the first and the second MH storage tanks 1010 and 1030 with each other, a compressor 1060 disposed in the middle of the pipe 1050, valves 1026, 1028, 1046, and 1048 for changing the direction of the compressor 1060, and a control unit 1070 for activating and regulating the above and other elements.

The first MH storage tank 1010 is connected to a first heat exchanger 1014 via a first heating medium circuit 1012. A heating medium, such as oil, for transmitting heat into and out of the tank 1010 is sealed in the first heating medium circuit 1012. The first heat exchanger 1014 exchanges heat generated by another heat-generating device (not shown) with heat generated by the first MH storage tank 1010. A hydrogen-storage alloy accommodated in the first MH storage tank 1010 absorbs or discharges hydrogen with variation in the pressure or the temperature inside the first MH storage tank 1010. In general, hydrogen-storage alloys absorb and accumulate hydrogen through an exothermic reaction and discharge hydrogen through an endothermic reaction. In a similar manner, the hydrogen-storage alloy in the MH storage tank 1010 absorbs or discharges hydrogen through the exothermic reaction or the endothermic reaction. As the interior pressure of the first MH storage tank 1010 is reduced to allow hydrogen to be discharged from the hydrogen-storage alloy in the first MH storage tank 1010, heat is absorbed from the first heating medium circuit 1012 to cool the first heat exchanger 1014. As the interior pressure of the first MH storage tank 1010 is heightened to allow hydrogen to be fed into the first MH storage tank 1010 and absorbed and accumulated into the hydrogen-storage alloy, on the other hand, heat is evolved and transmitted into the first heating medium circuit 1012 to heat the first heat exchanger 1014.

The first MH storage tank 1010 is provided with a first pressure gauge 1016 for detecting a hydrogen pressure P1 in the MH storage tank 1010 and a first thermometer 1018 for detecting a temperature T1 in the tank 1010. A first valve 1020 driven by a first actuator 1022 for regulating transmission of hydrogen into and out of the MH storage tank 1010 and a first flow meter 1024 for detecting a flow of hydrogen are disposed at a joint between the first MH storage tank 1010 and the pipe 1050. These measuring instruments and the actuator 1022 are connected to the control unit 1070.

The second MH storage tank 1030 is connected to a second heat exchanger 1034 via a second heating medium circuit 1032 where a heating medium for transmitting heat into and out of the second MH storage tank 1030 is sealed, in the same manner as the first MH storage tank 1010. A hydrogen-storage alloy accommodated in the second MH storage tank 1030 is identical with that in the first MH storage tank 1010. Like the operations of the first MH storage tank 1010 described above, the second heat exchanger 1034 is cooled by sucking hydrogen out of the second MH storage tank 1030 and heated by pressure-feeding hydrogen into the second MH storage tank 1030.

The second MH storage tank 1030 is also provided with a second pressure gauge 1036 for detecting a hydrogen pressure P2 in the MH storage tank 1030 and a second thermometer 1038 for detecting a temperature T2 in the tank 1030. A second valve 1040 driven by a second actuator 1042 for regulating transmission of hydrogen into and out of the MH storage tank 1030 and a second flow meter 1044 for detecting a flow of hydrogen are disposed at a joint between the second MH storage tank 1030 and the pipe 1050. These measuring instruments and the actuator 1042 are connected to the control unit 1070.

Under the condition of opening the valves 1026 and 1048 and closing the valves 1028 and 1046, the compressor 1060 sucks hydrogen out of the first MH storage tank 1010 and pressure-feeds the sucked hydrogen into the second MH storage tank 1030. Under the condition of opening the valves 1028 and 1046 and closing the valves 1026 and 1048, the compressor 1060 sucks hydrogen out of the second MH storage tank 1030 and pressure-feeds the suck hydrogen into the first MH storage tank 1010. The compressor 1060 has an operation switch (not shown) connecting with the control unit 1070 and is activated and controlled by the control unit 1070.

Figure 20:
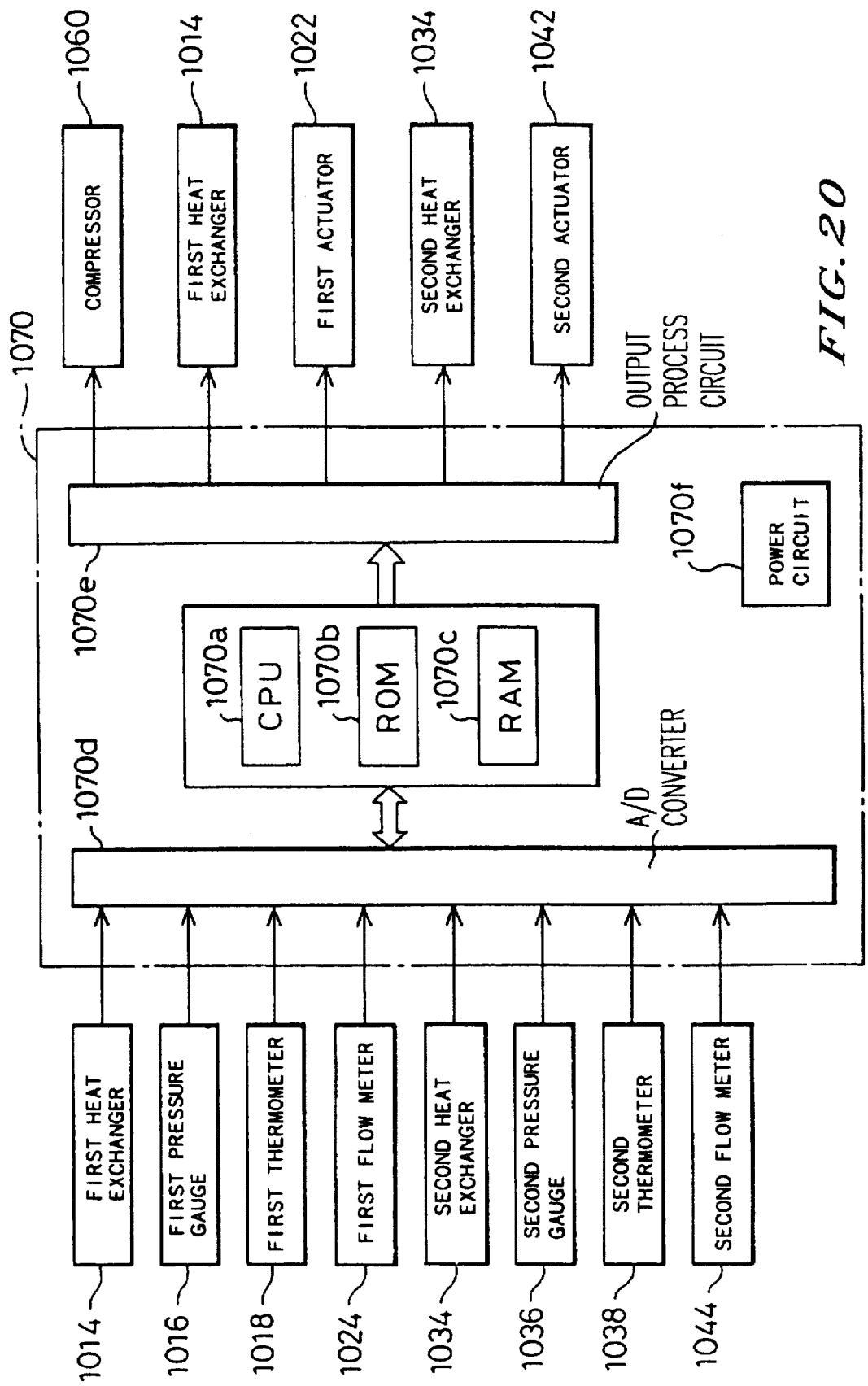
FIG. 20 is a block diagram showing an electric structure of the system control unit including a control unit 1070.

The control unit 1070 is constructed as logic circuits including a microcomputer as illustrated in FIG. 20. The control unit 1070 specifically includes: a CPU 1070a for executing a variety of operations according to preset control programs so as to control the heat pump 1001; a ROM 1070b in which control programs and, control data are previously stored to allow the CPU 1070a to execute the variety of operations; a RAM 1070c which various data required for the operations of the CPU 1070a are temporarily written in and read out; an A/D converter 1070d for receiving detection signals from the various measuring instruments and apparatus mentioned above; and an output process circuit 1070e for outputting driving signals to the compressor 1060 and the first and the second actuators 1022 and 1042 based on the results of operations by the CPU 1070a. The control unit 1070 further includes a power circuit 1070f, which supplies a required voltage to each of the various elements described above. The control unit 1070 thus constructed regulates operations of the heat pump 1001.

When the compressor 1060 is operated under the condition of opening the valves 1020, 1040, 1026, and 1048 of the heat pump 1001 and closing the other valves 1028 and 1046, hydrogen is sucked out of the first MH storage tank 1010 and pressure-fed into the second MH storage tank 1030. Aspiration by the compressor 1060 lowers the interior pressure of the first MH storage tank 1010 and destroys the equilibrium of hydrogen absorption and discharge, thereby allowing the hydrogen-storage alloy in the first MH storage tank 1010 to discharge hydrogen. Accompanied with discharge of hydrogen, heat is absorbed from the first heating medium circuit 1012 to cool the first heat exchanger 1014.

Compression by the compressor 1060, on the other hand, raises the interior pressure of the second MH storage tank 1030 and destroys the equilibrium of hydrogen absorption and discharge, thereby allowing the hydrogen-storage alloy in the second MH storage tank 1030 to absorb and accumulate hydrogen. Accompanied with absorption of hydrogen, heat is evolved and transmitted to the second heating medium circuit 1032 to heat the second heat exchanger 1034.

When the compressor 1060 is operated under the condition of opening the valves 1020, 1040, 1028, and 1046 of the heat pump 1001 and closing the other valves 1026 and 1048, the hydrogen-storage alloy in the second MH storage tank 1030 discharges hydrogen to cool the second heat exchanger 1034 via the second heating medium circuit 1032. In the meantime, the hydrogen-storage alloy in the first MH storage tank 1010 absorbs hydrogen to heat the first heat exchanger 1014 via the first heating medium circuit 1012.

The control unit 1070 executes an operation control program (not shown) to drive and control the heat pump 1001. During operation of the heat pump 1001, the control unit 1070 executes a first abnormality monitor routine illustrated in the flowchart of FIG. 21 as well as the operation control program.

Figure 22:
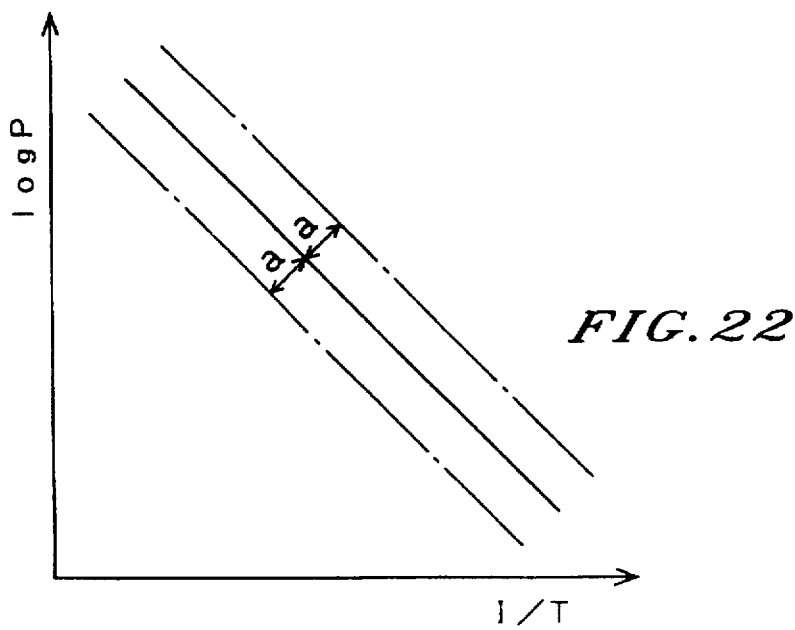
FIG. 22 is a graph showing a normal operation range of each MH storage tank based on the relationship between the reciprocal of the temperature T and the logarithm of the hydrogen pressure P.

When the program enters the first abnormality monitor routine, the CPU 1070a reads the first hydrogen pressure P1 and the second hydrogen pressure P2 of the respective MH storage tanks 1010 and 1030 detected by the first and the second pressure gauges 1016 and 1036 and the first temperature T1 and the second temperature T2 of the MH storage tanks detected by the first and the second thermometers 1018 and 1038 at step S2100. The CPU 1070a then determines at step S2110 whether the relationship between the first hydrogen pressure P1 and the first temperature T1 of the first MH storage tank 1010 and that between the second hydrogen pressure P2 and the second temperature T2 of the second MH storage tank 1030 read at step S2100 are respectively within a predetermined range. The predetermined range is, for example, a range having a width of a fixed value 'a' on both sides of an approximate curve (van't Hoff equation) defined by the logarithm of the hydrogen pressure P plotted against the reciprocal of the temperature T as shown in FIG. 22. The fixed value 'a' is set to be a little greater than pressure fluctuations due to operation of the heat pump 1001 to allow the fluctuations. Although the value 'a' is fixed irrespective of the temperature T in the embodiment, 'a' may vary depending upon the temperature T. The van't Hoff equation is expressed as $\log P = \Delta H/RT - \Delta S/R$ where P is the pressure, $\Delta H$ the enthalpy of reaction, R the gas constant, T the absolute temperature and $\Delta S$ entropy of reaction.

When either of the relationship between the hydrogen pressure P1 and the temperature T1 and that between the hydrogen pressure P2 and the temperature T2 of the respective MH storage tanks 1010 and 1030 is out of the predetermined range at step S2110, the CPU 1070a determines that any of the pressure gauges 1016 and 1036, the thermometers 1018 and 1038, and the MH storage tanks 1010 and 1030 is abnormal, closes the first and the second valves 1020 and 1040, and inactivates the compressor 1060 to stop operation of the heat pump 1001. In another preferable structure, determining a deviation of any one of the hydrogen pressures P1 and P2 and the temperatures T1 and T2 from the predetermined range, the CPU 1070a flashes an alert lamp or sounds an alarm to inform the user of abnormal operation instead of forcibly stopping the heat pump 1001. Although operation of the heat pump 1001 is immediately stopped in response to determination of the deviation from the predetermined range in the embodiment, there may be other preferable structures. Examples of such preferable structures include: that for stopping operation of the heat pump 1001 after continually determining the deviation from the predetermined range at a certain number of times; and that for stopping operation of the heat pump 1001 when any one of the hydrogen pressures P1 and P2 and the temperatures T1 and T2 is continuously out of the predetermined range and at the same side of the P-T curve of the van't Hoff equation.

The processing of step S2110 is executed at every start of operation of the heat pump 1001 in the operation control program (not shown). When a deviation of any one of the hydrogen pressures P1 and P2 and the temperatures T1 and T2 of the respective MH storage tanks 1010 and 1030 from the predetermined range is detected in the operation control program, the CPU 1070a keeps the valves and the compressor 1060 under non-service conditions and does not start actual operation of the heat pump 1001.

When the relationship between the first hydrogen pressure P1 and the first temperature T1 of the first MH storage tank 1010 and that between the second hydrogen pressure P2 and the second temperature T2 of the second MH storage tank 1030 are in the predetermined range at step S2110, the CPU 1070a determines that the pressure gauges 1016 and 1036, the thermometers 1018 and 1038, and the MH storage tanks 1010 and 1030 are all normal. The program then proceeds to step S2120 at which the CPU 1070a reads first and second hydrogen flows by volume VQ1 and VQ2 ($m^3$/sec) detected by the first and the second flow meters 1024 and 1044 via the A/D converter 1070d. At step S2130, the CPU 1070a determines first and second hydrogen flows by weight MQ1 and MQ2 (kg/sec) based on the hydrogen pressures P1 and P2, the temperatures T1 and T2, and the hydrogen flows by volume VQ1 and VQ2 read at steps S2100 and S2120.

Figure 23:
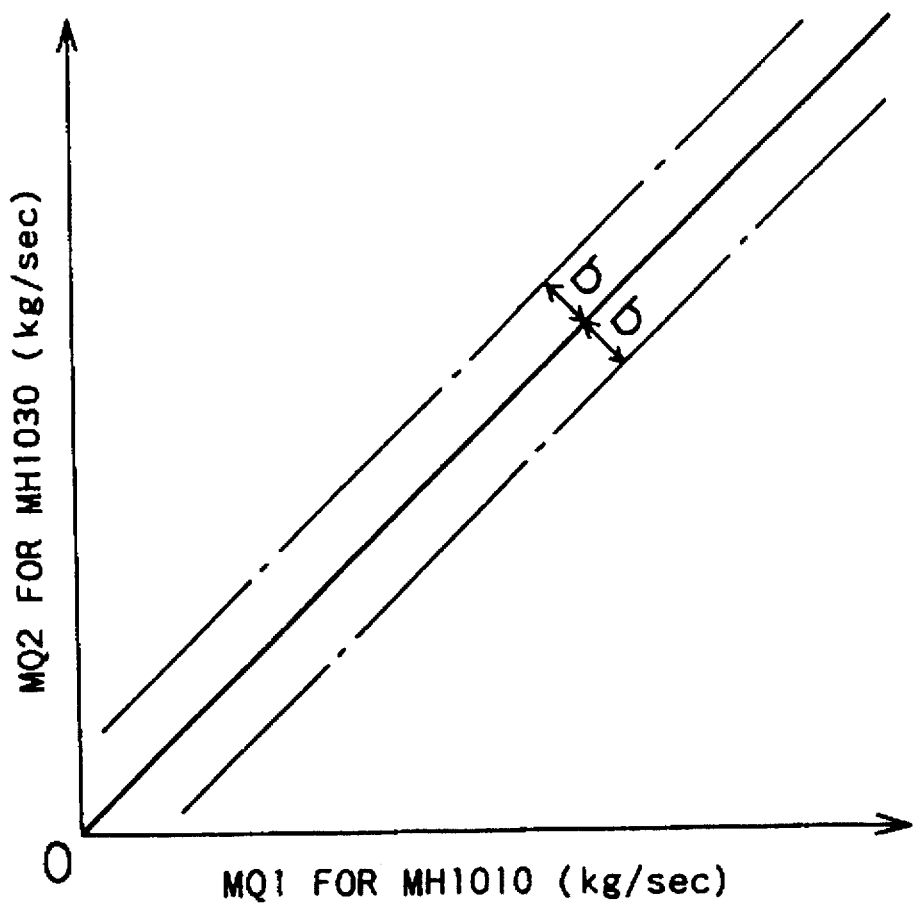
FIG. 23 is a graph showing a normal operation range of the heat pump 1001 based on the relationship between the first hydrogen flow by weight MQ1 and the second hydrogen flow by weight MQ2.

The CPU 1070a then determines whether the relationship between the first and the second hydrogen flows by weight MQ1 and MQ2 is within a predetermined range at step S2140. FIG. 23 is a map showing an example of the predetermined range. In this example, the predetermined range is a range having a width of a fixed value 'b' on both sides of a plane curve MQ1=MQ2. While operation of the heat pump 1001 is in steady state, the first hydrogen flow by weight MQ1 is equal to the second hydrogen flow by weight MQ2. That is, the difference between MQ1 and MQ2 is equal to zero. The fixed value 'b' is set to allow and compensate for measuring errors of the first and the second flow meters 1024 and 1044 and pressure fluctuations due to operation of the heat pump 1001. Although the value 'b' is fixed irrespective of the first hydrogen flow by weight MQ1 of the first MH storage tank 1010 in the embodiment, 'b' may vary depending upon the first hydrogen flow by weight MQ1.

When the relationship between the first hydrogen flow by weight MQ1 and the second hydrogen flow by weight MQ2 is within the predetermined range at step S2140, the CPU 1070a determines that all the related elements including the flow meters 1024 and 1044 are normal, and allows the heat pump 1010 to continue operation at step S2150. After execution of step S2150, the program returns to step S2100 to repeat the routine. When the relationship between the first and the second hydrogen flows by weight MQ1 and MQ2 is out of the predetermined range at step S2140, on the other hand, the CPU 1070a determines that there is abnormality in the first flow meter 1024, the second flow meter 1044 or another related element, closes the first and the second valves 1020 and 1040, and inactivates the compressor 1060 to stop operation of the heat pump 1001. In another preferable structure, determining a deviation of either the first hydrogen flow by weight MQ1 or the second hydrogen flow by weight MQ2 from the predetermined range, the CPU 1070a flashes an alert lamp or sounds an alarm to inform the user of abnormal operation instead of forcibly stopping the heat pump 1001. Although operation of the heat pump 1001 is immediately stopped in response to determination of the deviation from the predetermined range in the embodiment, there may be other preferable structures. Examples of such preferable structures include: that for stopping operation of the heat pump 1001 after continually determining the deviation from the predetermined range at a certain number of times; and that for stopping operation of the heat pump 1001 when either the first hydrogen flow by weight MQ1 or the second hydrogen flow by weight MQ2 is continuously out of the predetermined range and at the same side of the curve MQ1=MQ2.

As described above, the system control unit of the embodiment detects abnormality of the pressure gauges 1016 and 1036, the thermometers 1018 and 1038, and the MH storage tanks 1010 and 1030 according to the relationship between the hydrogen pressure P and the temperature T in each MH storage tank following the van't Hoff equation. The system control unit also detects abnormality of either the first flow meter 1024 or the second flow meter 1044 or troubles such as unexpected leakage of hydrogen due to an accident, based on the difference between the first hydrogen flow by weight MQ1 taken out of the hydrogen-evolving MH storage tank 1010 and the second hydrogen flow by weight MQ2 pressure-fed into the hydrogen-absorbing MH storage tank 1030.

The system control unit stops operation of the heat pump 1001 immediately after detection of abnormality, which prevents operation of the heat pump 1001 with low efficiency. The alternative structure explained above informs the user of abnormal operation of the heat pump 1001 without delay through the alert lamp or the alarm sound. The system control unit determines conditions of the various measuring instruments and the other elements at every start of operation of the heat pump 1001. This effectively prevents the heat pump 1001 from starting operation under abnormal conditions.

The heat pump 1001 may include three or more MH storage tanks instead of the two MH storage tanks in the embodiment. In such a case, the system control unit determines conditions of each MH storage tank based on the relationship between the hydrogen pressure and the temperature in each MH storage tank, and detects abnormality of flow meters or other related elements based on the difference between a total hydrogen flow by weight of hydrogen-evolving MH storage tanks and the same of hydrogen-absorbing MH storage tanks.

Figure 21:
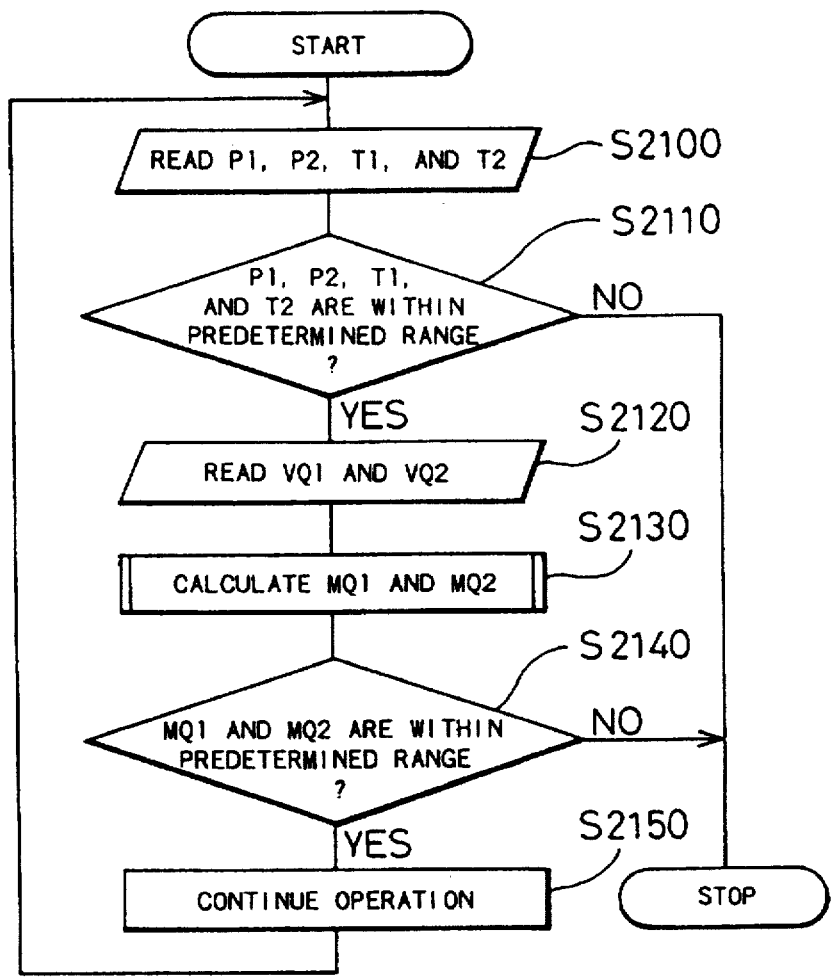
FIG. 21 is a flowchart showing a first abnormality monitor routine executed by a CPU 1070a of the control unit 1070.
Figure 24:
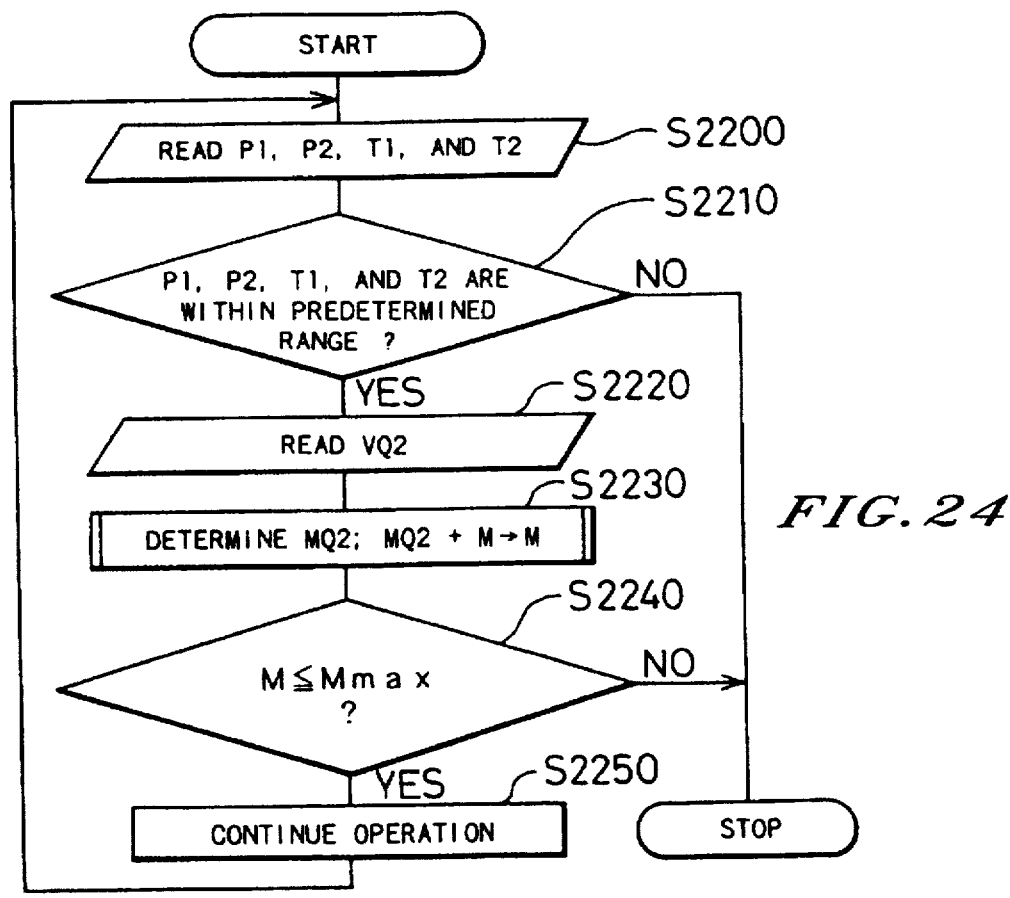
FIG. 24 is a flowchart showing a second abnormality monitor routine executed by the CPU 1070a of the control unit 1070.

In the heat pump 1001 of the embodiment, the control unit 1070 may execute a second abnormality monitor routine shown in the flowchart of FIG. 24 in place of the first abnormality monitor routine shown in FIG. 21. When the program enters the second abnormality monitor routine, the CPU 1070a determines at step S2210 whether the relationship between a first hydrogen pressure P1 and a first temperature T1 of the first MH storage tank 1010 and that between a second hydrogen pressure P2 and a second temperature T2 of the second MH storage tank 1030 read at step S2200 are within a predetermined range in the same manner as the first abnormality monitor program shown in FIG. 21. When all the hydrogen pressures P1 and P2 and the temperatures T1 and T2 are within the predetermined range at step S2210, the program proceeds to step S2220 at which the CPU 1070a reads a hydrogen flow by volume VQ2 detected by the second flow meter 1044. At step S2230, the CPU 1070a calculates a hydrogen flow by weight MQ2 for the second hydrogen pressure P2, the second temperature T2, and the hydrogen flow by volume VQ2 read at previous steps, and adds the hydrogen flow by weight MQ2 to a total weight of hydrogen M pressure-fed into the second MH storage tank 1030. The total weight of hydrogen M determined at step S2230 is compared with a preset upper limit Mmax at step S2240. The preset upper limit Mmax represents a hydrogen absorption capacity of the MH storage tank 1030 or a maximum weight of hydrogen absorbed and stored in the hydrogen-storage alloy in the second MH storage tank 1030. When the total weight of hydrogen M is not greater than the preset upper limit Mmax, the CPU 1070a determines that the heat pump 1001 is under normal operating conditions and allows the heat pump 1001 to continue operation at step S2250. After execution of step S2250, the program returns to step S2200 to repeat the routine. When the total weight of hydrogen M is greater than the preset upper limit Mmax or the hydrogen absorption capacity of the MH storage tank 1030, on the other hand, the CPU 1070a determines that there is abnormality in either the second flow meter 1044 or the second MH storage tank 1030 and stops operation of the heat pump.

The system control unit executing the second abnormality monitor routine detects abnormality of the second flow meter 1044 or the second MH storage tank 1030 through comparison of the total weight of hydrogen M fed into the MH storage tank 1030 with the hydrogen absorption capacity of the MH storage tank 1030, thereby effectively preventing the flow meter 1044 or the MH storage tank 1030 from operating under abnormal conditions. When the flow meter 1044 works normally, the total weight of hydrogen M fed into the second MH storage tank 1030 does not exceed the hydrogen absorption capacity of the MH storage tank 1030. Operation of the MH storage tank 1030 under abnormally high pressure conditions or even little troubles of the MH storage tank 1030 can thus be detected adequately.

Figure 25:
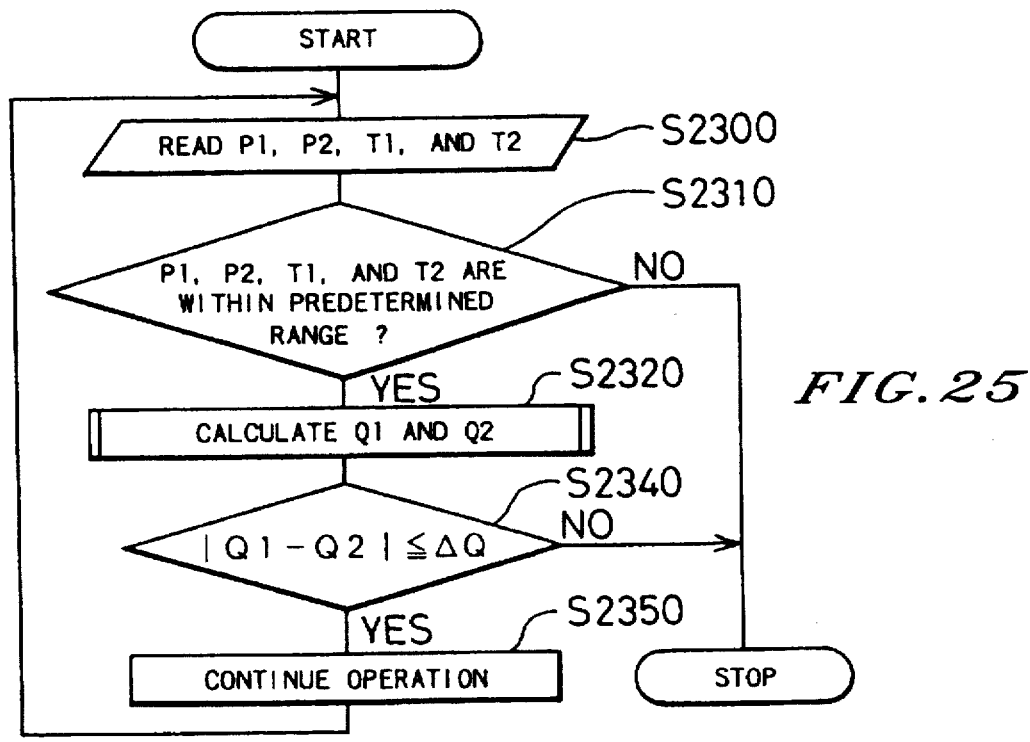
FIG. 25 is a flowchart showing a third abnormality monitor routine executed by the CPU 1070a of the control unit 1070.

In the heat pump 1001 of the embodiment, the control unit 1070 may execute a third abnormality monitor routine shown in the flowchart of FIG. 25 in place of the first abnormality monitor routine shown in FIG. 21. When the program enters the third abnormality monitor routine, the CPU 1070a determines at step S2310 whether the relationship between a first hydrogen pressure P1 and a first temperature T1 of the first MH storage tank 1010 and that between a second hydrogen pressure P2 and a second temperature T2 of the second MH storage tank 1030 read at step S2300 are within a predetermined range in the same manner as the first abnormality monitor program shown in FIG. 21. When all the hydrogen pressures P1 and P2 and the temperatures T1 and T2 are within the predetermined range at step S2310, the program proceeds to step S2320 at which the CPU 1070a determines a first calorie Q1 exchanged by the first heat exchanger 1014 and a second calorie Q2 exchanged by the second heat exchanger 1034 based on the flows, the heat capacities, and the temperature differences of the heating media circulating in the first and the second heating medium circuits 1012 and 1032. An absolute difference between the first calorie Q1 and the second calorie Q2 is then compared with a preset value ΔQ at step S2340. The value ΔQ is set to be a little greater than a deviation due to the calories emitted from the first and the second heating medium circuits 1012 and 1032 and the first and the second heat exchangers 1014 and 1034. When the absolute difference between the first calorie Q1 and the second calorie Q2 is not greater than the preset value ΔQ, the CPU 1070a determines that the heat pump 1001 is under normal operating conditions and allows the heat pump 1001 to continue operation at step S2350. After execution of step S2350, the program returns to step S2300 to repeat the routine. When the absolute difference is greater than the preset value ΔQ at step S2340, on the other hand, the CPU 1070a determines that the heat pump 1001 is under abnormal operating conditions and immediately stops operation of the heat pump 1001.

The system control unit executing the third abnormality monitor program detects abnormal operation of the heat pump 1001 based on the calorie applied onto the heat pump 1001 and the calorie taken out of the heat pump 1001. This allows the heat pump 1001 to be operated with high working efficiency. Although operation of the heat pump 1001 is immediately stopped when the absolute difference of the calories Q1 and Q2 is greater than the preset value ΔQ, there may be other preferable structures. Examples of such preferable structures include: that for stopping operation of the heat pump 1001 after continually determining the absolute difference greater than the present value ΔQ at a certain number of times; and that for stopping operation of the heat pump 1001 when subtraction of the second calorie Q2 from the first calorie Q1 continuously gives the same negative or positive sign and the absolute difference between the calories Q1 and Q2 is greater than the preset value ΔQ.

In the system control unit executing the third abnormality monitor routine, the hydrogen-storage alloy accommodated in the first MH storage tank 1010 is identical with that in the second MH storage tank 1030. The hydrogen-storage alloy accommodated in the second MH storage tank 1030 may, however, be different from that in the first MH storage tank 1010. In the latter case, calories generated from the heating medium circuits and the heat exchangers are respectively converted to the amounts of hydrogen based on the amount of heat absorption and the amount of heat evolution accompanied with hydrogen discharge and absorption of 1 kilogram of hydrogen from and into each hydrogen-storage alloy. The difference between or the ratio of the amounts of hydrogen is then compared with a predetermined value.

Figure 26:
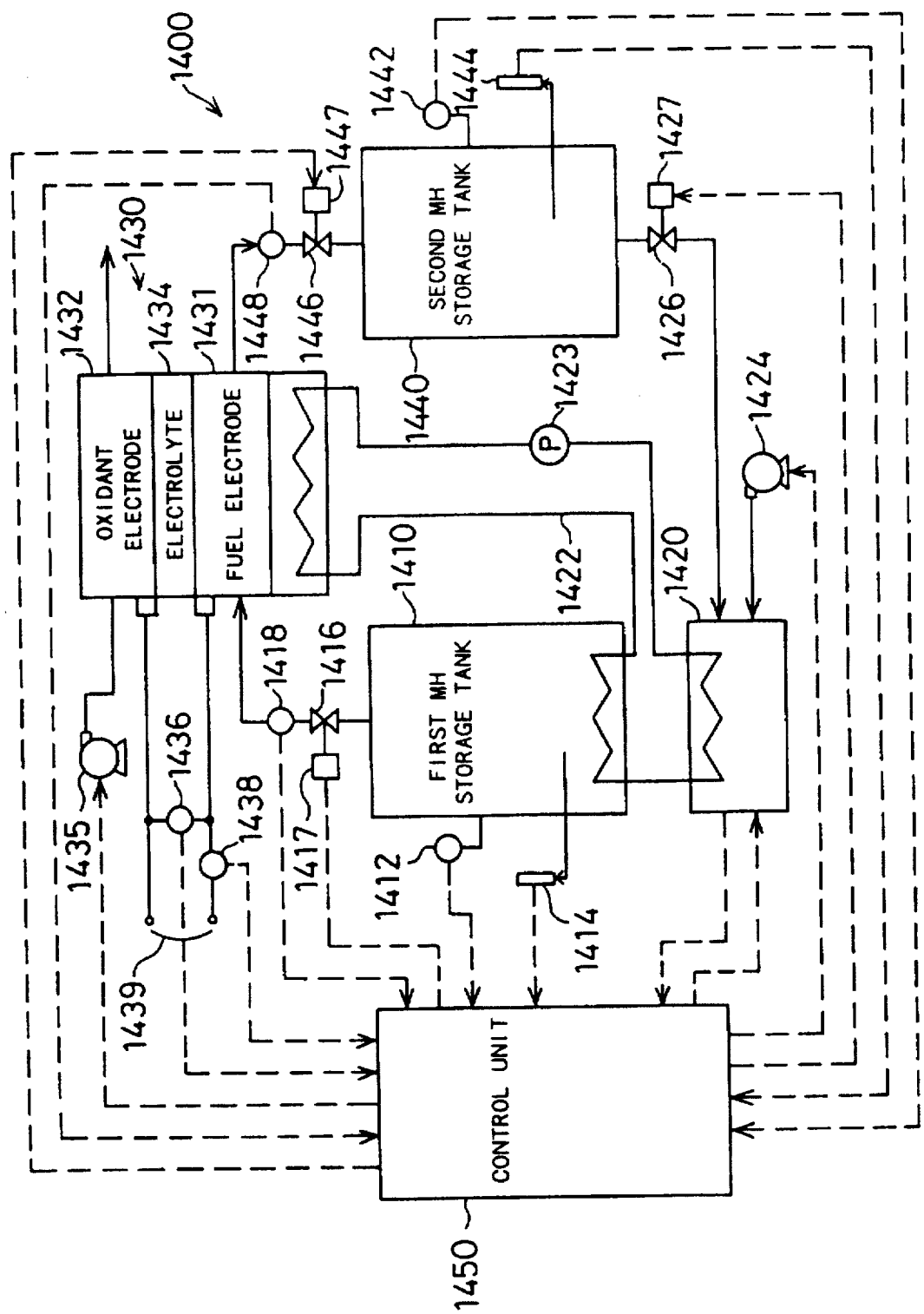
FIG. 26 is a block diagram schematically showing a second system control unit applied to a fuel cell system 1400.

A second system control unit including an abnormality detection unit and a control unit in accordance of the invention is applied to a fuel cell system 1400, which works with hydrogen taken out of a metal hydrides storage tank as illustrated in the block diagram of FIG. 26.

The fuel cell system 1400 includes first and second metal hydrides storage tanks (hereinafter referred to as MH storage tanks) 1410 and 1440 filled with hydrogen-storage alloys, a heat exchanger 1420 connecting with the first MH storage tank 1410 via a heating medium circuit 1422, a fuel cell 1430 for generating power with hydrogen and oxygen as fuels, and a control unit 1450 for activating and controlling the above and other elements.

The first MH storage tank 1410 connects with the fuel cell 1430 and the heat exchanger 1420 via the heating medium circuit 1422. The first MH storage tank 1410 discharges hydrogen from the hydrogen-storage alloy accommodated therein in response to the heat supply from the heat exchanger 1420. Hydrogen discharged from the first MH storage tank 1410 is supplied into the fuel cell 1430. The first MH storage tank 1410 is provided with a first pressure gauge 1412 for detecting a first hydrogen pressure P3 in the MH storage tank 1410 and a first thermometer 1414 for detecting a first temperature T3 in the MH storage tank 1410. A first valve 1416 driven by a first actuator 1417 for regulating the hydrogen discharge from the first MH storage tank 1410 and a first flow meter 1418 for detecting a flow of hydrogen taken out of the first MH storage tank 1410 are disposed at a hydrogen outlet of the first MH storage tank 1410. These measuring instruments and the first actuator 1417 are all connected to the control unit 1450.

The heat exchanger 1420 is also connected to the second MH storage tank 1440 and a first blower 1424. Hydrogen supplied from the second MH storage tank 1440 and the air supplied from the first blower 1424 are subjected to combustion in a combustion chamber (not shown) of the heat exchanger 1420. Heat generated by the combustion is supplied from the heat exchanger 1420 to the first MH storage tank 1410 via the heating medium circuit 1422. The heat exchanger 1420 is further connected to the control unit 1450 to be controlled by the control unit 1450 for combustion and heat exchange.

The fuel cell 1430 includes a fuel electrode (anode) 1431 receiving supply of hydrogen for the reaction of $H_2 \rightarrow 2H^+ + 2e^-$, an oxidant electrode (cathode) 1432 receiving supply of oxygen for the reaction of $2H^+ + 2e^- + \frac{1}{2}O_2 \rightarrow H_2O$, and an electrolyte 1434 for transferring hydrogen ions (protons) generated at the fuel electrode 1431 to the oxidant electrode 1432. Hydrogen taken out of the first MH storage tank 1410 is supplied to the fuel electrode 1431 and partly consumed for the oxidation. The non-reacted, residual hydrogen is transmitted to the second MH storage tank 1440. A second blower 1435 is disposed in a conduit to the oxidant electrode 1432 to supply the air into the oxidant electrode 1432. Oxygen contained in the air is partly consumed for the reduction at the oxidant electrode 1432 while the air containing the non-reacted, residual oxygen is discharged into the atmosphere. The fuel electrode 1431 and the oxidant electrode 1432 are connected to an output terminal 1439 via conductive lines. The power generated in the fuel cell 1430 is output through the output terminal 1439. The conductive lines are provided with a voltmeter 1436 for detecting a voltage or potential difference V between the fuel electrode 1431 and the oxidant electrode 1432, and an ammeter 1438 for detecting a current I running through the conductive lines. The voltmeter 1436 and the ammeter 1438 are connected to the control unit 1450.

The second MH storage tank 1440 has a conduit to connect with the fuel electrode 1431 of the fuel cell 1430 and the heat exchanger 1420. The hydrogen-storage alloy in the second MH storage tank 1440 absorbs and stores the residual hydrogen not reacted at the fuel electrode 1431 of the fuel cell 1430 while discharging and supplying hydrogen to the heat exchanger 1420. The second MH storage tank 1440 is provided with a second pressure gauge 1442 for detecting a second hydrogen pressure P4 in the MH storage tank 1440 and a second thermometer 1444 for detecting a second temperature T4 in the MH storage tank 1440. A second valve 1446 driven by a second actuator 1447 for regulating the hydrogen absorption into the second MH storage tank 1440 and a second flow meter 1448 for detecting a flow of hydrogen absorbed into the second MH storage tank 1440 are disposed at a hydrogen inlet of the second MH storage tank 1440 connecting with the fuel cell 1430. A third valve 1426 driven by a third actuator 1427 for regulating the hydrogen discharge from the second MH storage tank 1440 is disposed at a hydrogen outlet of the second MH storage tank 1440 connecting with the heat exchanger 1420. These measuring instruments and the actuators are all connected to the control unit 1450.

Figure 27:
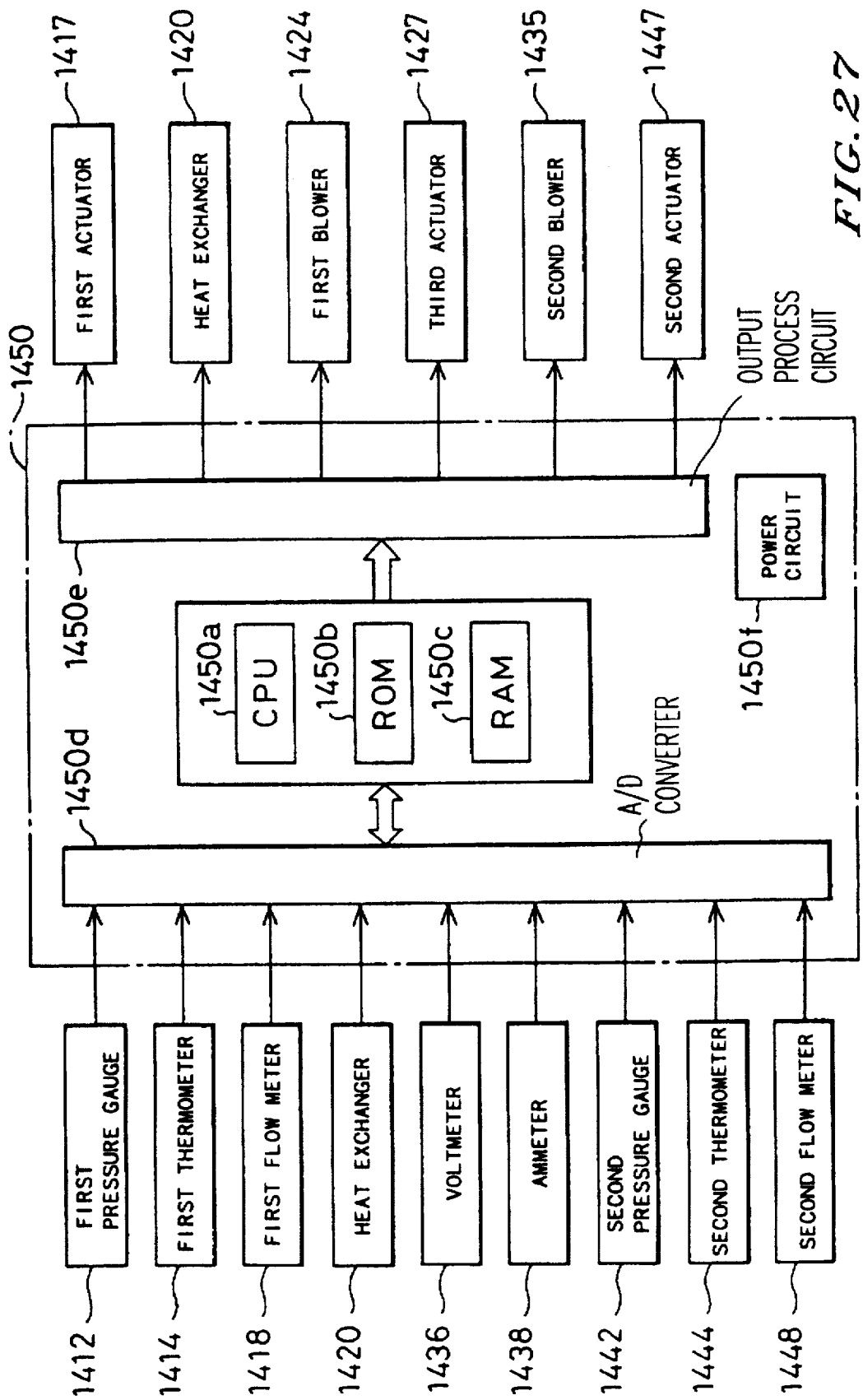
FIG. 27 is a block diagram illustrating an electric structure of a control system including a control unit 1450.

The control unit 1450 is constructed as logic circuits including a microcomputer as illustrated in FIG. 27. The control unit 1450 specifically includes: a CPU 1450a for executing a variety of operations according to preset control programs so as to control the fuel cell system 1400; a ROM 1450b in which control programs and control data are previously stored to allow the CPU 1450a to execute the variety of operations; a RAM 1450c which various data required for the operations of the CPU 1450a are temporarily written in and read out; an A/D converter 1450d for receiving detection signals from the various measuring instruments and apparatus mentioned above; and an output process circuit 1450e for outputting driving signals to the to the actuators 1417, 1427, and 1447, the blowers 1424 and 1435, and the heat exchanger 1420 based on the results of operations by the CPU 1450a. The control unit 1450 further includes a power circuit 1450f, which supplies a required voltage to each of the various elements described above.

The control unit 1450 thus constructed regulates operation of the fuel cell system 1400. When the CPU 1450a of the control unit 1450 outputs driving signals to the third actuator 1427 and the first blower 1424 via the output process circuit 1450e as well as to the heat exchanger 1420, hydrogen taken out of the second MH storage tank 1440 and the air fed by the blower 1424 are subjected to combustion in the combustion chamber (not shown) of the heat exchanger 1420 to generate heat. The heat is then supplied from the heat exchanger 1420 to the first MH storage tank 1410 via the heating medium circuit 1422. The hydrogen-storage alloy in the first MH storage tank 1410 discharges hydrogen in response to the heat supply. When the control unit 1450 outputs driving signals to the first actuator 1417 to open the first valve 1416, hydrogen discharged from the first MH storage tank 1410 is fed into the fuel electrode 1431 of the fuel cell 1430.

Hydrogen is consumed for the oxidation at the fuel electrode 1431 of the fuel cell 1430 while oxygen contained in the air is consumed for the reduction at the oxidant electrode 1432. The fuel cell 1430 supplies electricity generated by the electrochemical conversion of hydrogen and oxygen to a device (not shown) connected to the output terminal 1439. The residual hydrogen not consumed at the fuel electrode 1431 is fed to the second MH storage tank 1440 and absorbed into the hydrogen-storage alloy in the MH storage tank 1440 while the CPU 1450a drives the second actuator 1447 to open the second valve 1446.

Figure 28:
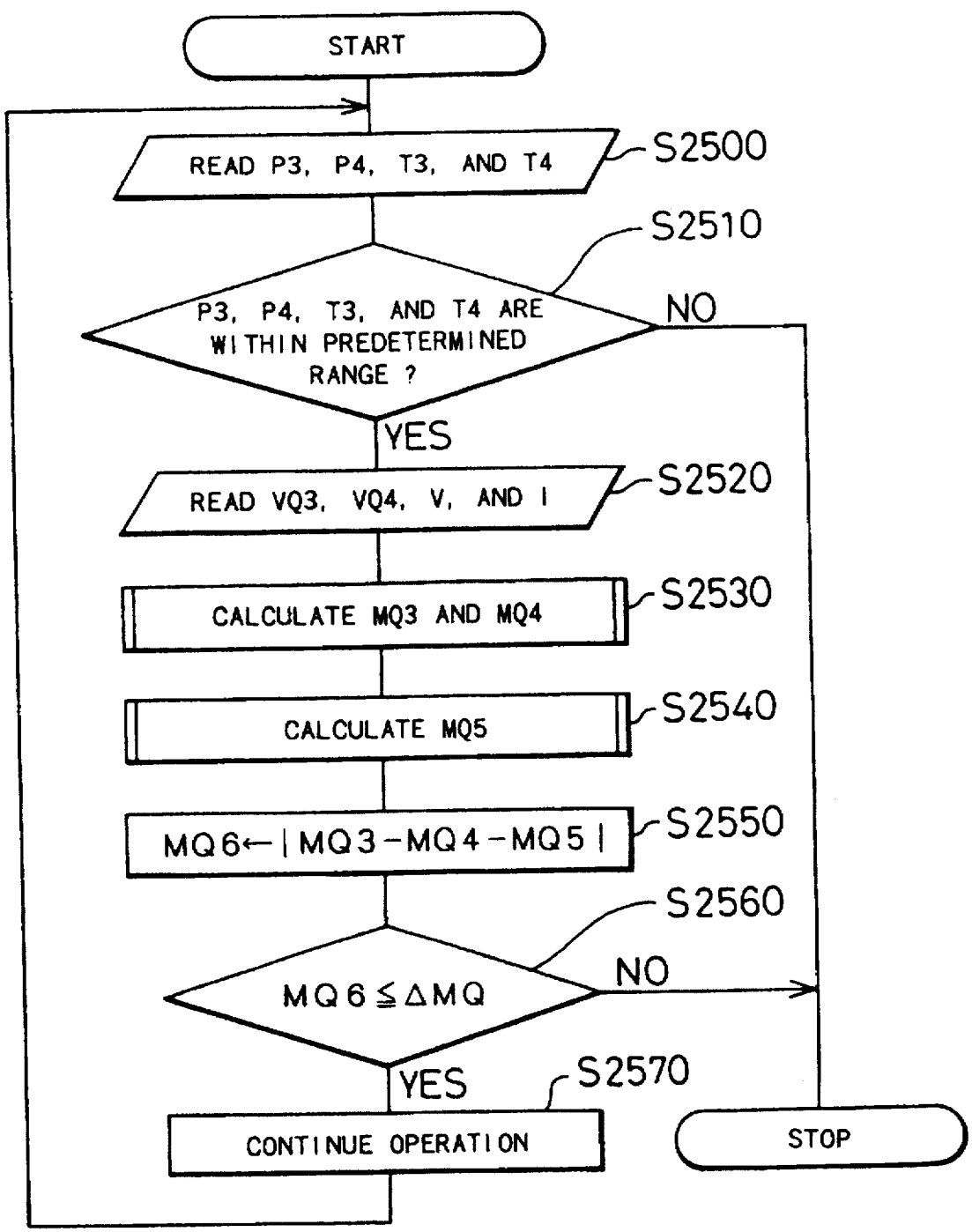
FIG. 28 is a flowchart showing an abnormality monitor routine executed by a CPU 1450a of the control unit 1450.

The control unit 1450 executes an operation control program (not shown) to drive and control the fuel cell system 1400. During operation of the fuel cell system 1400, the control unit 1450 executes a abnormality monitor routine illustrated in the flowchart of FIG. 28 as well as the operation control program.

When the program enters the abnormality monitor routine, the CPU 1450a reads the first hydrogen pressure P3 and the second hydrogen pressure P4 of the respective MH storage tanks 1410 and 1440 detected by the first and the second pressure gauges 1412 and 1442 and the first temperature T3 and the second temperature T4 of the MH storage tanks detected by the first and the second thermometers 1414 and 1444 at step S2500. The CPU 1450a then determines at step S2510 whether the relationship between the first hydrogen pressure P3 and the first temperature T3 and that between the second hydrogen pressure P4 and the second temperature T4 are within a predetermined range as described previously. The processing of step S2510 is executed at every start of operation of the fuel cell system 1400 in the operation control program (not shown). When a deviation of any one of the hydrogen pressures P3 and P4 and the temperatures T3 and T4 from the predetermined range is detected in the operation control program, the CPU 1450a keeps the valves under non-service conditions and does not start actual operation of the fuel cell system 1400.

When all the hydrogen pressures P3 and P4 and the temperatures T3 and T4 are within the predetermined range at step S2510, the program proceeds to step S2520 at which the CPU 1450a reads a first hydrogen flow by volume VQ3 detected by the first flow meter 1418, a second hydrogen flow by volume VQ4 detected by the second flow meter 1448, the voltage V detected by the voltmeter 1436, and the current I detected by the ammeter 1438. At step S2530, the CPU 1450a calculates a first hydrogen flow by weight MQ3 and a second hydrogen flow by weight MQ4 according to the hydrogen pressures P3 and P4, the temperatures T3 and T4, and the hydrogen flows by volume VQ3 and VQ4 read at steps S2500 and S2520. At step S2540, a third hydrogen flow by weight MQ5 consumed by the fuel cell 1430 is also calculated for the voltage V and the current I read at step S2520.

An absolute hydrogen flow by weight MQ6 is then determined as an absolute difference between the first hydrogen flow by weight MQ3 and the total of the second and the third hydrogen flows by weight MQ4 and MQ5 at step S2550. The absolute hydrogen flow by weight MQ6 is compared with a preset value ΔMQ at step S2560. The value ΔMq is set to be a little greater than a total error including detection errors of the flow meters 1418 and 1448, the voltmeter 1436, and the ammeter 1438. When the absolute hydrogen flow by weight MQ6 is not greater than the preset value ΔMQ at step S2560, the program goes to step S2570 at which the CPU 1450 determines that the fuel cell system 1400 is under normal operating conditions and allows the fuel cell system 1400 to continue operation. After execution of step S2570, the program returns to step S2500 to repeat the routine. When the absolute hydrogen flow by weight MQ6 is greater than the preset value ΔMQ at step S2560, on the other hand, the CPU 1450a determines that abnormality in any of the flow meters 1418 and 1448, the voltmeter 1436, and the ammeter 1438 or another trouble has lowered the efficiency of operation of the fuel cell system 1400, and closes the valves 1416, 1426, and 1446 to stop operation of the fuel cell system 1400.

The second system control unit described above detects abnormality of the pressure gauges 1412 and 1442, the thermometers 1414 and 1444, and the MH storage tanks 1410 and 1440 based on the hydrogen pressures and the temperatures of the MH storage tanks 1410 and 1440. The second system control unit also detects abnormality in the flow meters 1418 and 1448, the voltmeter 1436, and the ammeter 1438 and troubles such as unexpected leakage of hydrogen due to an accident, based on the first hydrogen flow by weight MQ3 taken out of the hydrogen-evolving MH storage tank 1410, the second hydrogen flow by weight MQ4 fed into the hydrogen-absorbing MH storage tank 1440, and the third hydrogen flow by weight MQ5 consumed by the fuel cell 1430. This effectively keeps the working efficiency of the fuel cell system 1400 sufficiently high.

The second system control unit stops operation of the fuel cell system 1400 immediately after detection of abnormality, which prevents operation of the fuel cell system 1400 with low efficiency. The second system control unit also determines conditions of the various measuring instruments and the other elements at every start of operation of the fuel cell system 1400. This effectively prevents the fuel cell system 1400 from starting operation under abnormal conditions.

The second system control unit stops operation of the fuel cell system 1400 when the absolute hydrogen flow by weight MQ6 is greater than the preset value ΔMQ. In another preferable structure, however, the control unit 1450 may flash an alert lamp or sound an alarm to inform the user of abnormal operation instead of forcibly stopping the fuel cell system 1400. Although operation of the fuel cell system 1400 is immediately stopped in response to a detection of the greater absolute hydrogen flow by weight MQ6 in the embodiment, there may be other preferable structures. Examples of such preferable structures include: that for stopping operation of the fuel cell system 1400 after continually detecting the greater absolute hydrogen flow by weight MQ6 at a certain number of times; and that for stopping operation of the fuel cell system 1400 when subtraction of the hydrogen flows by weight MQ4 and MQ5 from the first hydrogen flow by weight MQ3 continuously gives the same negative or positive sign and the absolute hydrogen flow by weight MQ6 is greater than the preset value ΔMQ.

In the second system control unit, the residual hydrogen not reacted at the fuel electrode 1431 of the fuel cell 1430 is absorbed into the hydrogen-storage alloy of the second MH storage tank 1440. The second MH storage tank 1440 may, however, be omitted provided that all the hydrogen is consumed for the oxidation at the fuel electrode 1431. In such a case, the absolute hydrogen flow by weight MQ6 is determined by subtracting the hydrogen flow by weight MQ5 consumed by the fuel cell 1430 from the hydrogen flow by weight MQ3 taken out of the MH storage tank 1410.

There may be many modifications, alternations, and changes without departing from the scope or spirit of essential characteristics of the invention. It is thus clearly understood that the above embodiment is only illustrative and not restrictive in any sense.

The scope and spirit of the present invention are limited only by the terms of the appended claims.

What is claimed is:

1. A combined system of a power generator and an air-conditioning apparatus, said combined system comprising:
    a metal hydrides storage tank having a hydrogen-storage alloy accommodated therein,
    a power generator for generating a power with hydrogen as a fuel;
    hydrogen compressor means for sucking hydrogen out of said metal hydrides storage tank in response to a load of said power generator and pressure-feeding said hydrogen into said power generator; and
    an air-conditioning apparatus for cooling air with a cooling power generated in said desorbing hydrogen from said metal hydrides storage tank.

2. A combined system in accordance with claim 1, further comprising:
    heat storage means for accumulating and storing an excess of said cooling power when said cooling power generated in describing said hydrogen from said metal hydrides storage tank is greater than a required cooling power for said air-conditioning apparatus, and for supplying a deficiency of cooling power when said cooling power generated in desorbing said hydrogen is smaller than said required cooling power.

3. A combined system in accordance with either one of claims 1 and 2, wherein said hydrogen compressor means sucks hydrogen out of said metal hydrides storage tank and pressure-feeds said hydrogen into said power generator so as to allow said metal hydrides storage tank to evolve said deficiency of cooling power when said cooling power supplied into said air-conditioning apparatus is smaller than said required cooling power for said air-conditioning apparatus.

4. A combined system of a power generator and an air-conditioning apparatus, said combined system comprising:
    a metal hydrides storage tank having a hydrogen-storage alloy accommodated therein;
    a power generator for generating a power with hydrogen as a fuel;
    an air-conditioning apparatus for cooling air with a cooling power generated in desorbing hydrogen from said metal hydrides storage tank; and
    hydrogen compressor means for sucking hydrogen out of said total hydrides storage tank to generate said cooling power required for said air-conditioning apparatus and pressure-feeding said hydrogen into said power generator.

5. A combined system in accordance with claim 4, wherein said power generator comprises a fuel cell for generating an electric power with hydrogen as a fuel,
    said combined system further comprising a secondary battery which is charged when said electric power generated by said fuel cell is greater than a desired level, and discharges when said electric power generated by said fuel cell is smaller than said desired level.

6. A combined system in accordance with claim 4, wherein said power generator comprises a fuel cell for generating an electric power with hydrogen as a fuel;
    said combined system further comprising thermoelectric conversion means which evolves a heat or a cooling power with an excess of said electric power when said electric power generated by said fuel cell is greater than said desired level, said heat being supplied into an endothermic device while said cooling power being supplied into an exothermic device.

7. A combined system of a power generator and an air-conditioning apparatus, said combined system comprising:
    a plurality of metal hydrides storage tanks respectively having hydrogen-storage alloys accommodated therein;
    a power generator for generating a power with hydrogen as a fuel;
    hydrogen compressor means for sucking hydrogen out of at least one metal hydrides storage tank among said plurality of metal hydrides storage tanks and pressure-feeding said hydrogen into another metal hydrides storage tank different from said metal hydrides storage tank;
    hydrogen supply means for supplying said hydrogen pressure-fed by said hydrogen compressor means into said power generator according to a load of said power generator; and
    an air-conditioning apparatus for cooling air with a cooling power generated in said desorbing hydrogen from said metal hydrides storage tank and heating air with a heat generated in absorbing hydrogen into said another metal hydrides storage tank.

8. A combined system in accordance with claim 7, wherein said hydrogen compressor means comprises means for regulating an amount of hydrogen led by means of pressure so as to allow said metal hydrides storage tank to generate said cooling power required for said air-conditioning apparatus or allow said another total hydrides storage tank to generate said heat required for said air-conditioning apparatus.

9. A combined system of a power generator and an air-conditioning apparatus, said combined system comprising:
    a metal hydrides storage tank having a hydrogen-storage alloy accommodated therein;

a power generator for generating a power with hydrogen as a fuel;

hydrogen compressor means for sucking hydrogen out of said metal hydrides storage tank in response to a load of said power generator and pressure-feeding said hydrogen into said power generator; and an air-conditioning apparatus having cooling power generator means for converting said power generated by said power generator to a cooling power, said air-conditioning apparatus being driven with said cooling power generated by said cooling power generator means end a cooling power generated in desorbing said hydrogen from said metal hydrides storage tank.

10. A combined system in accordance with claim 9, wherein said air-conditioning apparatus further comprises means for regulating a first amount of air which exchanges heat with said cooling power generated by said cooling power generator means and a second amount of air which exchanges heat with said cooling power generated in desorbing said hydrogen from said metal hydrides storage tank.

11. A combined system in accordance with claim 9, wherein said air-conditioning apparatus further comprises a mechanism for cooling air with said cooling layer generated by said cooling power generator means and said cooling power generated in desorbing said hydrogen from said metal hydrides storage tank.

12. A combined system in accordance with claim 9, wherein said cooling power generator means comprises a vapor compression refrigerator for generating a cooling power through compression, condensation, and expansion of a refrigerant.

13. A combined system in accordance with claim 12, wherein said air-conditioning apparatus further comprises heat exchange medium cooling means for cooling a heat exchange medium, which exchanges heat with said refrigerant at a time of condensation of said refrigerant by said cooling power generator means, with said cooling power generated in desorbing said hydrogen from said total hydrides storage tank, said heat exchange medium cooling means cooling said heat exchange medium prior to said heat exchange with said refrigerant.

14. A combined system of a power generator and an air-conditioning apparatus, said combined system comprising:

a metal hydrides storage tank having a hydrogen-storage alloy accommodated therein, a power generator for generating a power with hydrogen as a fuel;

hydrogen compressor means for sucking hydrogen out of said metal hydrides storage tank and pressure-feeding said hydrogen into said power generator; and an air-conditioning apparatus for cooling air with a cooling power generated in desorbing hydrogen from said metal hydrides storage tank by said hydrogen compressor means.

15. A combined system in accordance with claim 14, wherein said hydrogen compressor means sucks hydrogen out of said metal hydrides storage tank and pressure-feeds said hydrogen into said power generator in response to a load of said power generator.

16. A combined system in accordance with claim 14, wherein said hydrogen compressor means sucks hydrogen out of said metal hydrides storage tank to generate said cooling power required for said air-conditioning apparatus and pressure-feeds said hydrogen into said power generator.

17. A combined system in accordance with claim 14, said combined system comprising:

a second metal hydrides storage tank having a hydrogen storage alloy accommodated therein; and hydrogen introduction means for introducing a part of hydrogen sucked by said hydrogen compressor means into said second metal hydrides storage tank; wherein said air-conditioning apparatus cools air with a cooling power generated in desorbing hydrogen from said metal hydrides storage tank by said hydrogen compressor means and heats air with a heat generated by said hydrogen introduction means in introducing said hydrogen into said second metal hydrides storage tank.

18. A combined system in accordance with claim 14, said combined system comprising:

cooling power generator means for converting said power generated by said power generator to a cooling power; wherein said hydrogen compressor means sucks hydrogen out of said metal hydrides storage tank and pressure-feeds said hydrogen into said power generator in response to a load of said power generator; and said air-conditioning apparatus being driven with said cooling power generated by said cooling power generator means and a cooling power generated in desorbing hydrogen from said metal hydrides storage tank by said hydrogen compressor means.

* * * * *

UNITED STATES PATENT AND TRADEMARK OFFICE
CERTIFICATE OF CORRECTION

PATENT NO. : 5,678,410
DATED : OCTOBER 21, 1997
INVENTOR(S) : NOBUO FUJITA ET AL

It is certified that error appears in the above-identified patent and that said Letters Patent is hereby corrected as shown below:

On the Title Page, change the title to --COMBINED SYSTEM OF FUEL CELL AND AIR-CONDITIONING APPARATUS AND ABNORMALITY DETECTION UNIT AND CONTROL UNIT USED IN THE COMBINED SYSTEM--;

Column 37, line 51, delete "describing", insert --desorbing--;

Column 38, line 9, delete "total", insert --metal--;

Column 38, line 57, delete "led", insert --fed--;

Column 38, line 60, delete "total", insert --metal--;

Column 39, line 23, delete "layer", insert --power--;

Column 39, line 38, delete "total", insert --metal--;

Signed and Sealed this

Twenty-ninth Day of May, 2001

Attest:

NICHOLAS P. GODICI

Attesting Officer

Acting Director of the United States Patent and Trademark Office